(12) United States Patent
Okada

(10) Patent No.: US 7,580,484 B2
(45) Date of Patent: Aug. 25, 2009

(54) ORTHOGONAL FREQUENCY DIVISION MULTIPLEXING (OFDM) DEMODULATOR, INTEGRATED CIRCUIT FOR OFDM DEMODULATION AND OFDM DEMODULATION METHOD

(75) Inventor: Kunio Okada, Iruma (JP)

(73) Assignee: Casio Computer Co., Ltd., Tokyo (JP)

( * ) Notice: Subject to any disclaimer, the term of this patent is extended or adjusted under 35 U.S.C. 154(b) by 680 days.

(21) Appl. No.: 10/973,859

(22) Filed: Oct. 26, 2004

(65) Prior Publication Data

US 2005/0089108 A1 Apr. 28, 2005

(30) Foreign Application Priority Data

Oct. 27, 2003 (JP) ............................. 2003-365618
Sep. 30, 2004 (JP) ............................. 2004-288271

(51) Int. Cl.
*H04L 27/06* (2006.01)
(52) U.S. Cl. ...................... 375/340; 375/349; 370/206
(58) Field of Classification Search ................ 375/229, 375/316, 324–326, 340, 344, 349–350; 370/203, 370/206
See application file for complete search history.

(56) References Cited

U.S. PATENT DOCUMENTS

| 6,608,863 | B1 | 8/2003 | Onizawa et al. | |
|---|---|---|---|---|
| 6,618,352 | B1 * | 9/2003 | Shirakata et al. | 370/203 |
| 7,058,002 | B1 * | 6/2006 | Kumagai et al. | 370/203 |
| 7,139,340 | B2 * | 11/2006 | Scarpa | 375/344 |
| 2003/0210646 | A1 * | 11/2003 | Ohseki et al. | 370/203 |
| 2004/0001563 | A1 * | 1/2004 | Scarpa | 375/326 |
| 2005/0207334 | A1 * | 9/2005 | Hadad | 370/203 |

FOREIGN PATENT DOCUMENTS

| EP | 1 030 488 A2 | 8/2000 |
|---|---|---|
| EP | 1 349 335 A2 | 10/2003 |
| JP | 2002-344410 A | 11/2002 |

* cited by examiner

*Primary Examiner*—Jean B Corrielus
(74) *Attorney, Agent, or Firm*—Frishauf, Holtz, Goodman & Chick, P.C.

(57) ABSTRACT

An Orthogonal Frequency Division Multiplexing (OFDM) demodulator, an integrated circuit for OFDM demodulation and an OFDM demodulation method in which at least one of a predictive value generated by a low order symbol filter and a predictive value generated by a high order symbol filter interpolates the order of a high symbol direction, or a weighted composite value of the predictive values, is selected to accomplish waveform equivalence of a carrier outputted from a transform section.

23 Claims, 13 Drawing Sheets

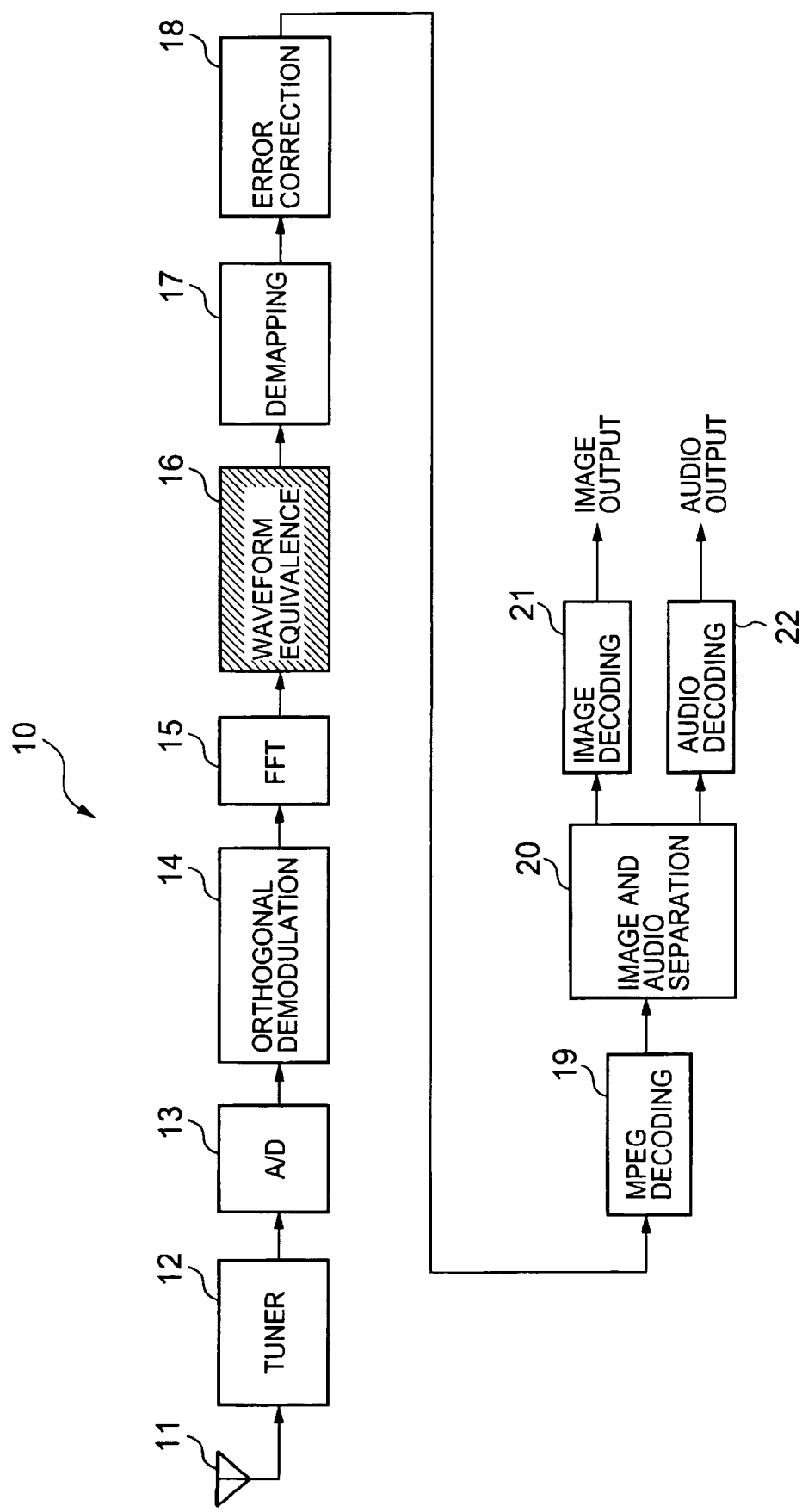

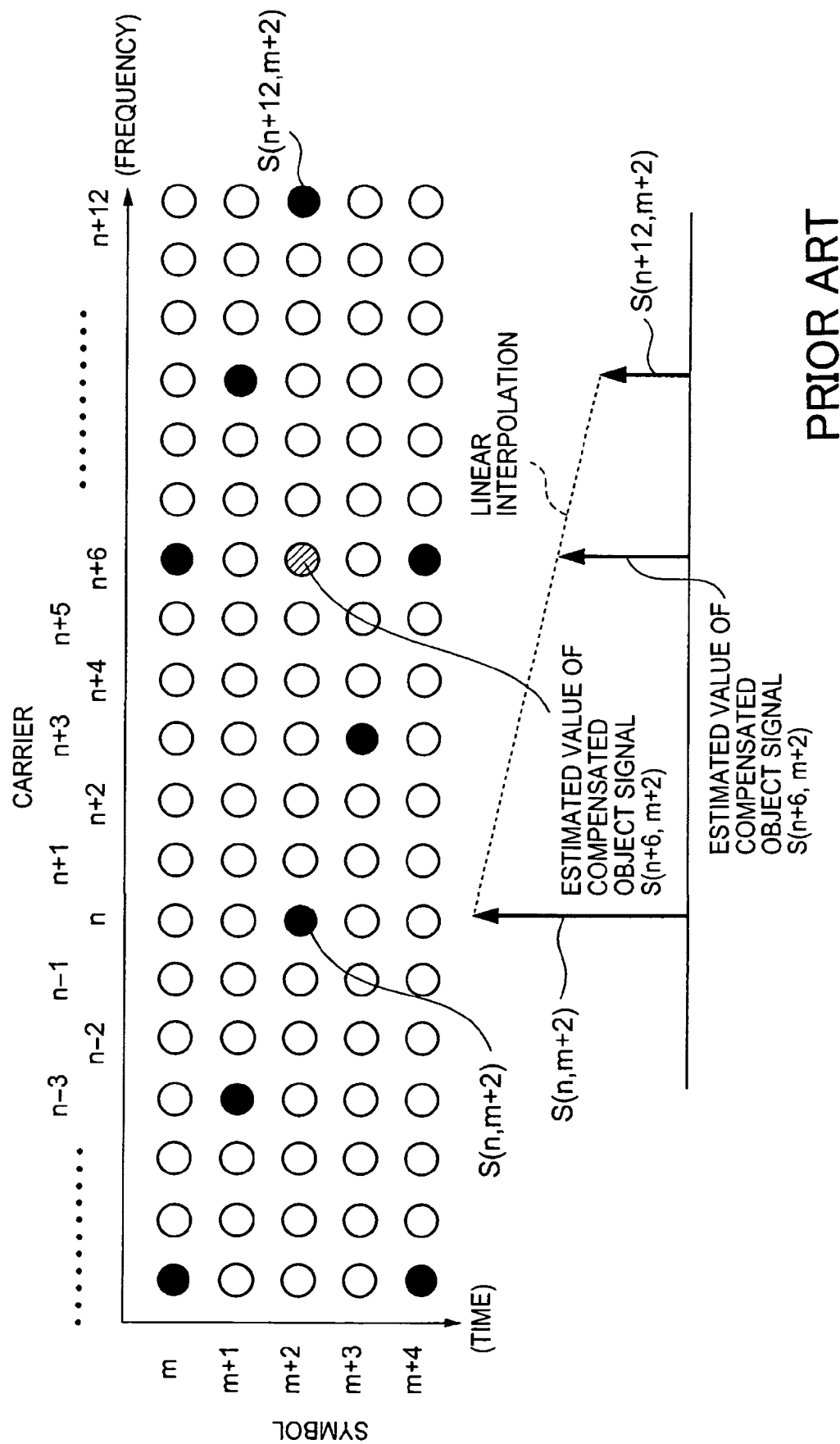

ORTHOGONAL FREQUENCY DIVISION MULTIPLEXING (OFDM) DEMODULATOR, INTEGRATED CIRCUIT FOR OFDM DEMODULATION AND OFDM DEMODULATION METHOD

CROSS-REFERENCE TO RELATED APPLICATIONS

This application is based upon and claims the benefit of priority from the prior Japanese Patent Application No. 2003-365618, filed Oct. 27, 2003 and 2004-288271, filed Sep. 30, 2004, the entire contents of which is incorporated herein by reference.

BACKGROUND OF THE INVENTION

1. Field of the Invention

The present invention relates to an Orthogonal Frequency Division Multiplexing (OFDM) demodulator, an integrated circuit for OFDM demodulation and an OFDM demodulation method used in demodulating equipment, such as terrestrial digital broadcasting.

2. Description of the Prior Art

An OFDM system enables transmission of a large number of individual carrier waves (carriers) at a high spectral density level which are orthogonally spaced in frequency and therefore do not interfere with each other within a transmission bandwidth. The data streams are allocated in the amplitude and phase of each carrier. This transmission technique efficiently performs digital modulation which can be Phase Shift Keying (PSK), Quadrature Amplitude Modulation (QAM), etc. Also, OFDM has a characteristic of being sufficiently resistant to multipath effects and fading interference (i.e., radio waves reflected by many types of surfaces, etc.). As for establishing a standard of digital terrestrial broadcasting which employs an OFDM technique, two leading systems known as ISDB-T: Integrated Services Digital Broadcasting-Terrestrial developed in Japan and DVB-T: Digital Video Broadcasting-Terrestrial developed in Europe have been proposed.

FIG. 12 is a line block diagram of a demodulator circuit proposed for use in a conventional terrestrial digital broadcasting receiver. Referring to FIG. 12, after a signal tuned in with a tuner 1 is converted into a digital signal by an Analog/Digital (A/D) converter 2, this digital signal is then inputted into a Fast Fourier Transform (FFT) 3 to transform the signal from an OFDM symbol domain signal (time domain) to an OFDM carrier domain signal (frequency domain). The OFDM carrier domain signal is outputted from the FFT 3 is inputted into a synchronizing signal circuit 4 and a waveform multiplication circuit 5. The synchronizing signal circuit 4 extracts a synchronizing signal (Scattered Pilot (SP) signal) from an OFDM carrier domain signal outputted from the FFT 3 and then outputs to a waveform multiplication circuit 5. Also, the OFDM carrier domain signal inputted into the waveform multiplication circuit 5 is outputted through a demodulator circuit 6, an error correction circuit 7, etc. after wave form equivalence processing is performed using a synchronizing signal outputted from the synchronizing signal circuit 4.

FIG. 13 is a drawing showing how the signal correction coefficients are derived from a constructive concept view of a received data signal in a conventional terrestrial digital broadcasting receiver. The horizontal direction shows the "frequency" direction which consists of different "carriers" (carrier waves). The vertical direction shows the "time" direction which consists of "symbols" which each define one data transmission unit. Similarly, the "carriers" are lined up along the horizontal direction and "symbols" are lined up in the vertical direction. The white circles in the drawing represent a carrier for a data signal. The black circles represent a carrier called known power and a synchronizing signal (Scattered Pilot or SP signal) with phase information. The white circles with hatching are data carriers storing data, such as images and audio, with a non-inserted synchronizing signal. For example, a synchronizing signal of the digital terrestrial broadcasting (ISDB-T) in Japan is inserted at intervals at the rate of one every twelve carriers in the frequency axis direction, as well as shifts and inserts in the frequency axis direction one carrier every three symbols in the time axis direction. Furthermore, the signal inserted in the transmission channels consists of segments whose parameters can be selected independently of each other. The ISDB-T system described above has adopted this type of Band Segmented Transmission OFDM (BST-OFDM).

Referring to FIG. 13, when a carrier signal segment like the one shown as a circle with hatching is distinguished as a carrier signal segment object for correction, a calculation method of the "signal correction coefficients" is applied. For example, a method which derives the calculated value with a straight line filter based on a plurality of synchronizing signals within the same symbol. Specifically, the method of predicting these coefficients uses a plurality of synchronizing signals S (n, m+2) and S (n+12, m+2) within the same symbol of the carrier signal segment object for correction S (n+6, m+2). Another method of predicting is based on the synchronizing signals between a plurality of symbols. Specifically, the prediction method using the synchronizing signals S (n+6, m) and S (n+6, m+4) over a plurality of symbols.

However, the prediction method based on a plurality of synchronizing signals within the same symbol is difficult to accomplish. Particularly, when a carrier signal segment object for correction is positioned close to the synchronizing signals, the proper adjustment can be performed. However, when a carrier signal segment object for correction is not positioned near the synchronizing signals, the proper adjustment is not easily established as there is a drawback of generating phasing errors.

The prediction method based on synchronizing signals between a plurality of symbols is an effective method only when there are no timing changes. When there are timing changes, proper adjustment is problematic and contains the same fault of being susceptible to generating an unacceptable error rate.

In addition, since the above-mentioned conventional example performs adjustment of only the proximity synchronizing signals, when a rapid change in the receiving environment occurs and the synchronizing signals received in either S (n, m+2) and S (n+12, m+2) are degraded or unrecognizable, the signal correction coefficients are also received with large variations. Thus, there is a drawback that demodulation processing of erroneous data will transpire. In other words, since channel variations during even one symbol will cause carrier interference in OFDM systems, these timing variations directly impact overall system performance by the loss of the carrier orthogonality.

As described in the above-mentioned conventional example, the overall performance of demodulating equipment deteriorates substantially under a multipath environment which is a composite waveform of two or more waves. Furthermore, as a level of Doppler phenomenon is created when a receiver shifts, the Carrier to Noise (C/N) ratio becomes higher and when significant becomes impossible to receive a signal below its C/N value.

SUMMARY OF THE INVENTION

The present invention features an Orthogonal Frequency Division Multiplexing (OFDM) demodulator, an integrated circuit for OFDM demodulation and an OFDM demodulation method. The present invention has been made in view of the conventional drawbacks mentioned above to markedly elevate reception capability in a manner executed by suitably selecting or combining the interpolation direction relative to an OFDM symbol.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 1 is a conceptual line block diagram of a terrestrial digital broadcasting television reception apparatus related to the present invention;

FIG. 13 is a drawing showing how the signal correction coefficients are derived from a constructive concept view of a received data signal in a conventional terrestrial digital broadcasting receiver.

DETAILED DESCRIPTION OF THE PREFERRED EMBODIMENTS

Figure 2A:
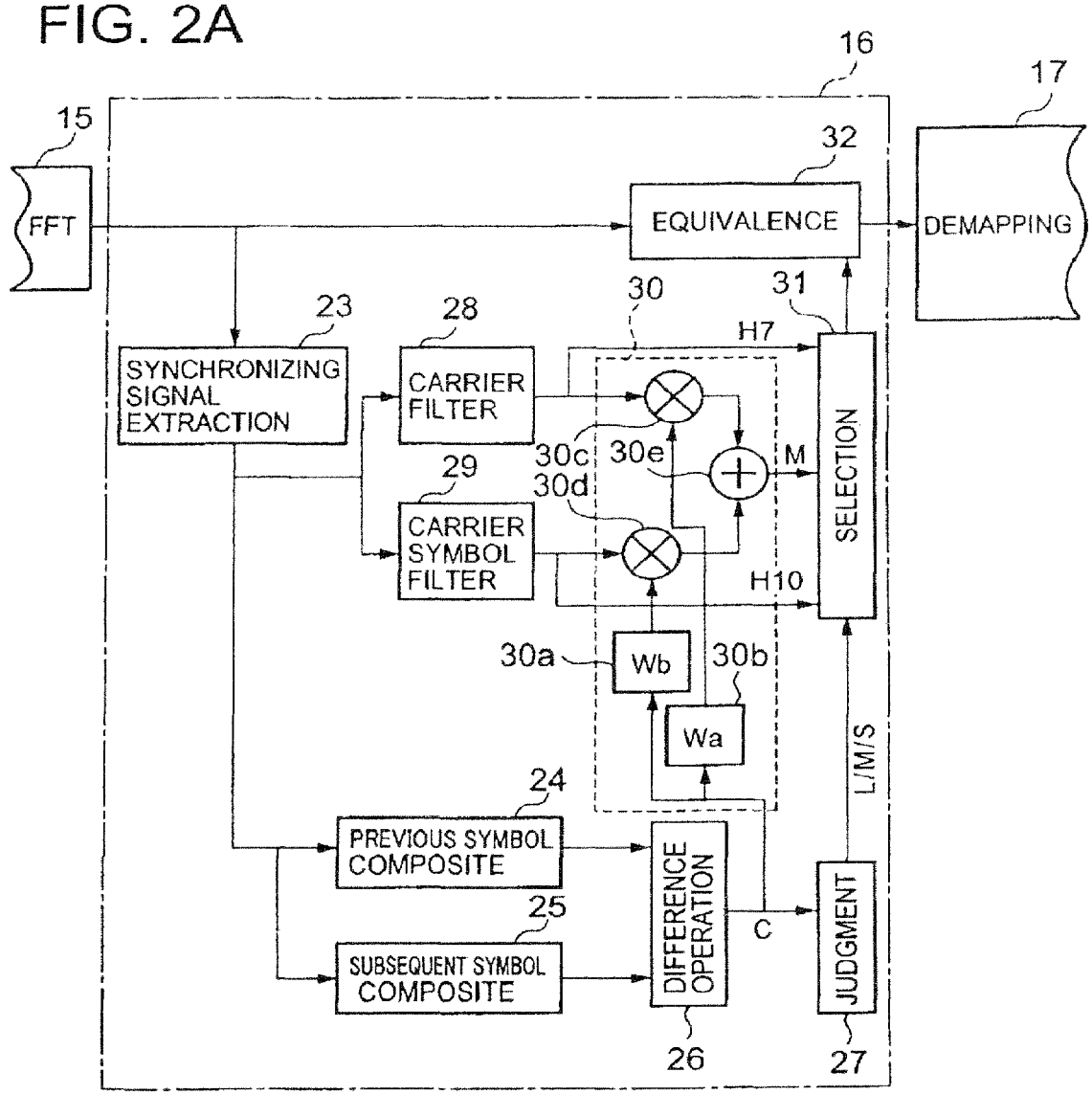
FIG. 2A is a block diagram of a waveform equivalence section 16 related to the present invention.

Hereinafter, the preferred embodiments of the present invention as applied to a terrestrial digital broadcasting television reception apparatus will hereinafter be described in detail with reference to the drawings. In the following explanation, the various specific details or examples, numerical values or character strings and other illustrative notations are intended as reference for performing the concept of the present invention. Accordingly the ideology of this invention as a whole or in part is not limited to this. Additionally, although explanation avoids covering the details regarding a well-known technique, a well-known procedure, a well-known architecture and a well-known circuit configuration (hereinafter denoted as a "common knowledge") for keeping the explanation succinct, these common knowledge particulars as a whole or in part are not intentionally excluded. Since a person skilled in the art can recognize such common knowledge at the time of filing the present invention, naturally certain references are included in the following explanation.

FIG. 1 is a conceptual line block diagram of a terrestrial digital broadcasting television reception apparatus. Referring to FIG. 1, a television reception apparatus 10 (OFDM demodulator) comprises an integrated circuit for use in demodulation and circuits such as an antenna 11, a tuner 12, an Analog/Digital (A/D) converter 13, an orthogonal demodulation section 14, a Fast Fourier Transform (FFT) section 15, a waveform equivalence section 16, a demapping section 17, an error correction section 18, a Moving Picture Experts Group (MPEG) decoding section 19, an image and audio separation section 20, an image decoding section 21 and an audio decoding section 22.

A terrestrial digital broadcasting signal delivered from a broadcasting station (not shown) is supplied to the tuner 12 as a Radio Frequency (RF) (High Frequency (HF)) signal. Afterwards the RF signal is converted into a predetermined Intermediate Frequency (IF) (Medium Frequency (MF)) with the tuner 12 and then processed into a digital signal by the A/D converter 13. This digital signal is sent to the orthogonal demodulation section 14. Orthogonal demodulation is then implemented using a carrier signal of predetermined frequency by the orthogonal demodulation section 14 and regenerated as an OFDM baseband signal. The signal following orthogonal demodulation is an OFDM symbol domain signal (time domain) prior to a FFT operation. The OFDM symbol domain signal is a complex signal containing a real axis component (I channel signal) and an imaginary axis component (Q channel signal) by undergoing orthogonal demodulation.

An OFDM symbol domain signal is forwarded to the FFT section 15 and transformed into an OFDM carrier domain signal (frequency domain) by the FFT section 15. The FFT section 15 extracts and outputs the data following orthogonal modulation of each carrier (carrier wave). Specifically, the FFT section 15 extracts the range of effective symbol length, namely, the length (for example, 2048 samples of carrier data) indicating the number of useful samples from one OFDM symbol, without the cyclic preamble or the guard interval period on the initial part of the symbol. An FFT operation is then generated relative to the OFDM symbol domain signal relative to this range. In this manner, an OFDM carrier domain signal outputted from the FFT section 15 is also a complex signal including a real axis component (I channel signal) and an imaginary axis component (Q channel signal) as well as the above-mentioned OFDM symbol domain signal.

The OFDM carrier domain signal after undergoing waveform equivalence (amplitude equivalence and phase equivalence) processing of each carrier (carrier wave) by the waveform equivalence section 16, which includes the distinctive configuration of the embodiment, progresses through to the demapping section 17 which performs demapping corresponding to a transmission system (16QAM—Quadrature Amplitude Modulation, etc.). Next, the error correction section 18 performs error correction using Viterbi decoding, Reed-Solomon (RS) code, etc. The Moving Picture Experts Group (MPEG) decoding section 19 accomplishes MPEG expansion of the signal after error correction. The image and audio separation section 20 separates the image signal and audio signal from a signal after MPEG expansion. The image decoding section 21 performs decode processing of the image signal and the audio decoding section 22 performs decode processing of the audio signal. Lastly, the signal is outputted to an image and audio reproduction section (or image and audio recording section) (not shown).

FIG. 2A is a block diagram of a waveform equivalence section 16. Referring to FIG. 2A, the waveform equivalence section 16 includes a synchronizing signal extraction section 23, a previous symbol composite circuit section 24, a subsequent symbol composite circuit section 25, a difference calculation circuit section 26, a judgment circuit section 27, a carrier filter 28, a carrier symbol filter 29, a weighting circuit section 30, a selection circuit section 31, an equivalence circuit section. The weighting circuit section 30 further has two weight value generation circuits 30a, 30b, a multiplication circuit section 30c, a multiplication circuit section 30d and an addition circuit section 30e. The two weight value generation circuits 30a, 30b generate two weight values (Wa, Wb) as the characteristics and amount differs with regard to the output (C) of the difference calculation circuit section 26. The multiplication circuit section 30c performs multiplication of a first weight value Wa and the output of the carrier filter 28. The multiplication circuit section 30d performs multiplication of a second weight value Wb and the output of the carrier symbol filter 29. The addition circuit section 30e adds the multiplication result of the two multiplication circuit sections 30c, 30d.

Figure 2B:
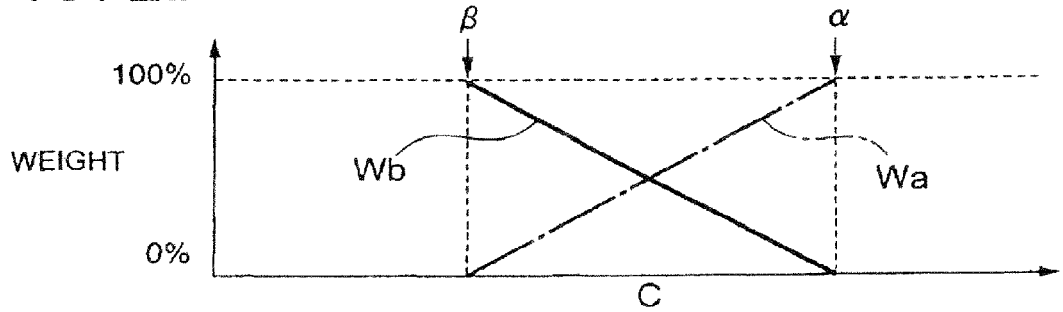
FIG. 2B is a characteristic diagram of two weight values (Wa, Wb) in which the characteristics and amount differs with regard to the output (C) of the difference calculation circuit section 26.

FIG. 2B is a characteristic diagram of two weight values (Wa, Wb). The vertical direction indicates weight ratio (%) and the horizontal direction indicates the amount of output (C) of the difference calculation circuit section 26. The first weight value Wa and the second weight value Wb represent the characteristics which intersect at about 50% within the range of a predetermined threshold value ($\alpha$, $\beta$). Accordingly, the first weight value Wa of the difference calculation circuit section 26 output (C) increases from 0% to 100% in a range which increases from $\beta$ to $\alpha$. Meanwhile, the second weight value Wb has a characteristic which decreases conversely from 100% to 0% in the same range.

Figure 3A:
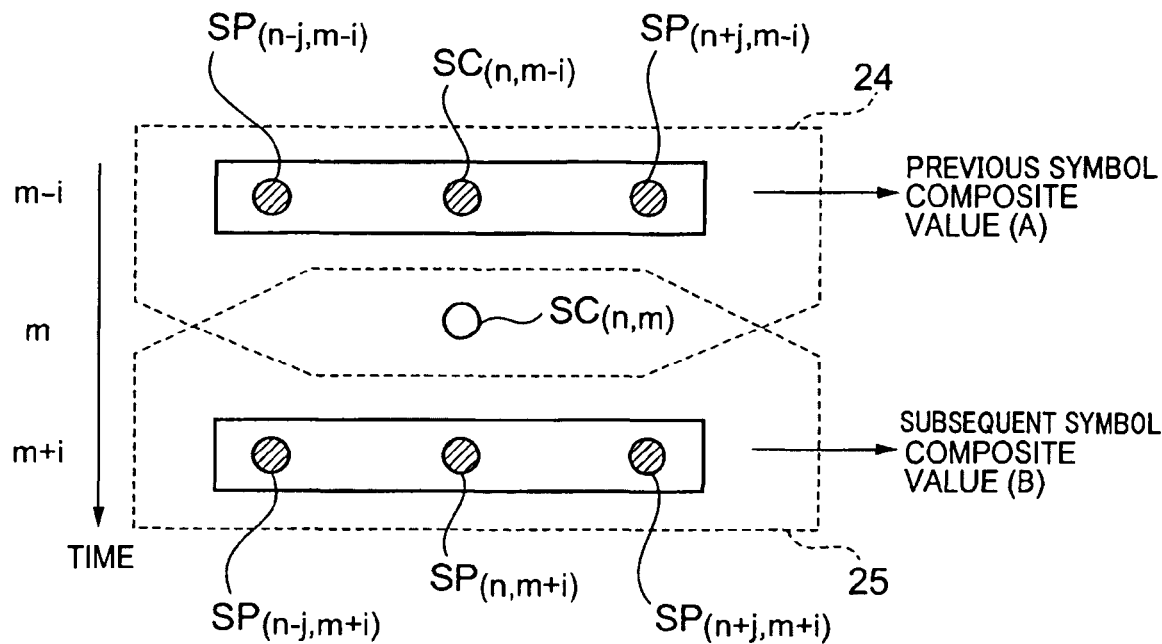
FIG. 3A is a conceptual diagram of a previous symbol composite circuit section 24 and subsequent symbol composite circuit section 25 related to the present invention.
Figure 3B:
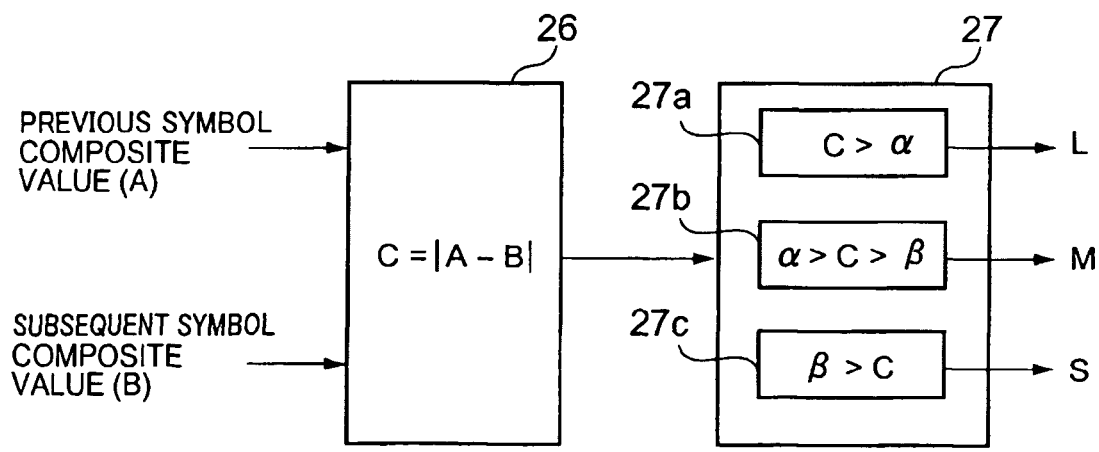
FIG. 3B is a conceptual diagram of a difference calculation circuit section 26 and a judgment circuit section 27 related to the present invention.

FIGS. 3A and 3B are conceptual diagrams of the previous symbol composite circuit section 24, the subsequent symbol composite circuit section 25, the difference calculation circuit section 26 and the judgment circuit section 27.

First, the previous symbol composite circuit section 24 and the subsequent symbol composite circuit section 25 will be explained. Referring to FIG. 3A, SC (n, m) is an observation carrier with a non-inserted synchronizing signal (Scattered Pilot or SP signal) distinguished as a carrier signal segment object for correction. The previous symbol composite circuit section 24 and the subsequent symbol composite circuit section 25 individually generate output of the two values in relation to SC (n, m). The two values serve as a previous symbol composite value (A) and a subsequent symbol composite value (B). Referring to FIG. 3A, SP (n–j, m–i), SP (n, m–i) and SP (n+j, m–i) are synchronizing symbols inputted into the previous symbol composite circuit section 24. Also, SP (n–j, m+i), SP (n, m+i) and SP (n+j, m+i) are synchronizing signals inputted into the subsequent symbol composite circuit section 25.

Here, m is the symbol number of the symbol direction (time axis direction); m–i is the symbol number to which only i is situated in the previous position (past position or direction to send in terms of time) in the time axis direction from the observation carrier m; and m+1 is the symbol number to which only i is situated in the subsequent position (future position or progress direction) from the observation carrier m. Furthermore, n is the carrier number of the observation carrier SC (n, m); n–j is the carrier number to which only j is situated in a previous position (low frequency wave position) in the frequency axis direction (carrier direction) from the carrier number n of the observation carrier and n+j is the carrier number to which only j is situated in a subsequent position (high frequency wave position) in the frequency axis direction from the carrier n.

In this manner, the previous symbol composite circuit section 24 calculates and outputs the three inputted synchronizing signals, namely, the previous symbol composite value (A) of SP (n–j, m–i), SP (n, m–i) and SP (n+j, m–i). Similarly, the subsequent symbol composite circuit section 25 calculates and outputs the three inputted synchronizing signals, namely, the subsequent symbol composite value (B) of SP (n–j, m+i), SP (n, m+i) and SP (n+j, m+i).

In this example, even though a composite number of three synchronizing signals is illustrated, the present invention is not limited to this quantity. In principle, the required number is in the range from three to six synchronizing signals.

Although the previous symbol composite value (A) and the subsequent symbol composite value (B) were calculated in reference to symbols in positions separated at the same interval of only i in the previous and subsequent time axis direction from a carrier signal segment object for correction (observation carrier SC example above), a previous and subsequent symbol at a different interval in the time axis direction from a carrier signal segment object for correction can be utilized. For instance, a previous symbol separated at an interval of only i ahead of the time axis direction and a subsequent symbol separated at an interval of only k behind the time axis direction from a carrier signal segment object for correction may be used to calculate a composite value in each symbol.

Referring now to FIG. 3B, the difference calculation circuit section 26 calculates the difference of a previous symbol composite value (A) and the subsequent symbol composite value (B) to distinguish a carrier signal segment object for correction by detecting whether or not a symbol previous and/or subsequent in the time axis direction (symbol direction) has fluctuated in terms of time. The size correlation of the above-described difference is judged in three steps and a determination result is outputted. For example, this operation comprises a absolute value difference calculation circuit which calculates an absolute value difference (C) of the previous symbol composite value (A) and the subsequent symbol composite value (B). In addition, a judgment circuit section 27 comprises three comparison circuits 27a~27c which compare the output (absolute value difference (C)) of the difference calculation circuit section 26 with the threshold values $\alpha$, $\beta$ of two amounts and outputs the comparison results (L, M, S).

Here, the two threshold values $\alpha$, $\beta$ have a relation of $\lceil \alpha > \beta > 0 \rfloor$. For this reason, the determination results in the judgment circuit section 27 become any of three: $\lceil C > \alpha \rfloor$, ⌈α>C>β⌋, and ⌈β>C⌋. Accordingly, any of three cases can result: case (L) whereby the absolute value difference (C) of the previous symbol composite value (A) and the subsequent symbol composite value (B) exceeds α, case (M) is less than α and exceeds β, or case (S) is less than β.

Signal L is outputted on occasions when a difference of a previous symbol composite value (A) and a subsequent symbol composite value (B) is extreme (i.e., when an amplitude variation and/or phase fluctuation in the time axis accompanying multipath effects and fading interference become significant). Signal M is outputted on occasions when a difference of a previous symbol composite value (A) and a subsequent symbol composite value (B) is not so severe (i.e., when minimal fading and multipath effects are occurring moderately). Signal S is outputted on occasions when a difference of a previous symbol composite value (A) and a subsequent symbol composite value (B) has not occurred in the case of zero or a level which can be disregarded (i.e., fading or multipath effects).

Figure 4:
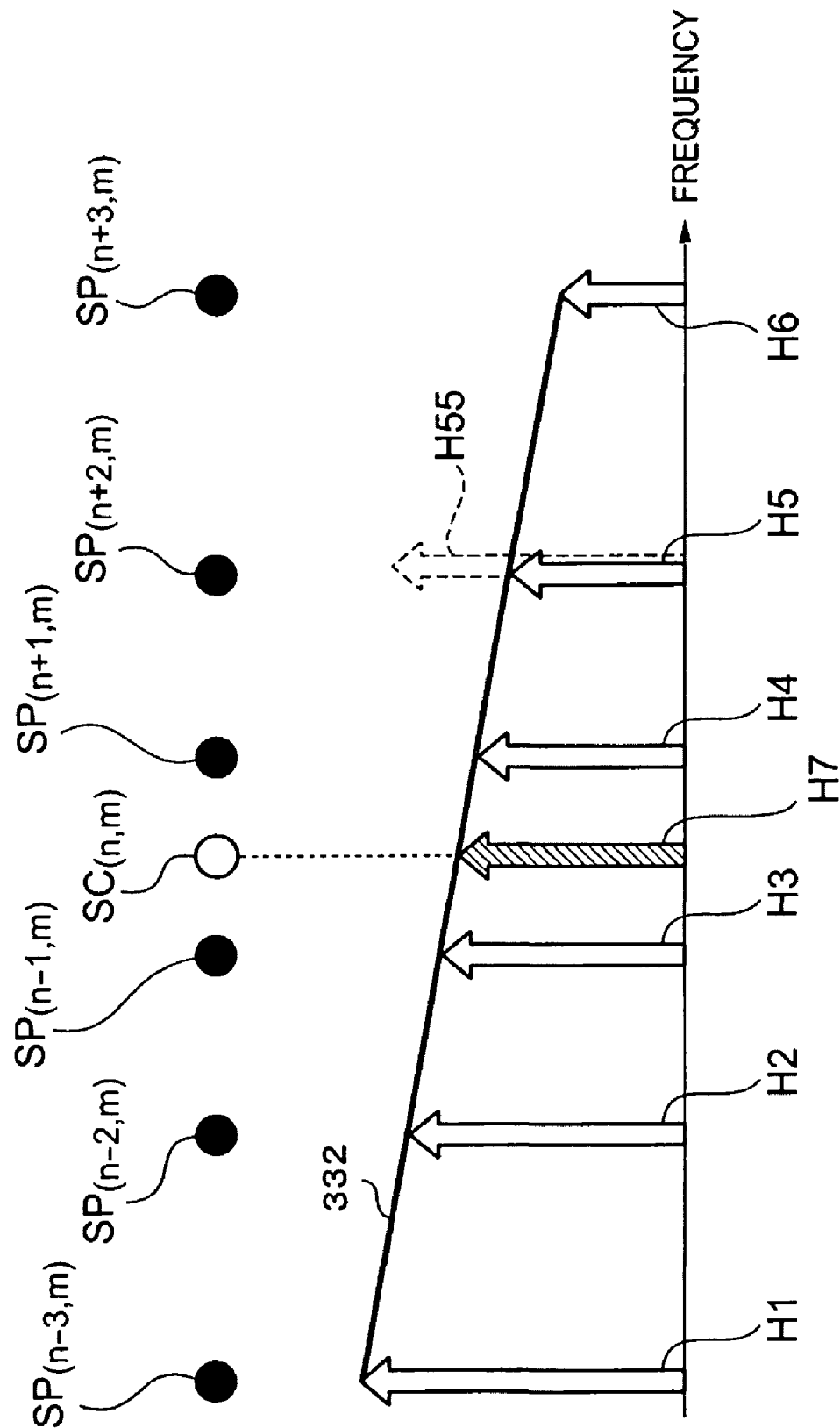
FIG. 4 is a conceptual diagram of a carrier filter 28 related to the present invention.

FIG. 4 is a conceptual diagram of the carrier filter 28. The carrier filter 28 is about the observation carrier SC (n, m) of a carrier signal segment object for correction within a same symbol number m, for example, in each of the previous and subsequent three segments for a total of six synchronizing signals. Thus, SP (n−3, m), SP (n−2, m), SP (n−1, m), SP (n+1, m), SP (n+2, m) and SP (n+3, m) are input signals and linear interpolation is performed. Subsequently, the transmission characteristic of an observation carrier SC (n, m) is predicted and output as a signal correction coefficient.

Here, H1 is the value of SP (n−3, m), H2 is the value of SP (n−2, m), H3 is the value of SP (n−1, m), H4 is the value of SP (n+1, m), H5 is the value of SP (n+2, m), and H6 is the value of SP (n+3, m). A predictive value H7 of the transmission characteristic for a carrier signal segment object for correction SC (n, m) is acquired from the point above the straight line 332 which connects the values H1~H6.

When the predictive value H7 of carrier SC (n, m) distinguished as a carrier signal segment object for correction is calculated, this carrier SC (n, m) can be changed into one of the above-mentioned six synchronizing signals. Namely, SP (n−3, m), SP (n−2, m), SP (n−1, m), SP (n+1, m), SP (n+2, m) and SP (n+3, m), and a predictive value of other carriers can be acquired.

When there is variation in a carrier direction, for example, when a value in some of the synchronizing signals is widely different as observed in H55 of FIG. 4, the predictive value H7 of the transmission characteristic for an observation carrier SC (n, m) can be calculated correctly, without receiving any variation effects of a carrier direction, by exclusion and performing linear interpolation on such a significantly different value H55.

Furthermore, as described above, each of the previous and subsequent three segments for a total of six synchronizing signals within the same symbol number m are constituted as input signals. Although linear interpolation of these is performed and the transmission characteristic of an observation carrier SC (n, m) is predicted, the number of synchronizing signal is not limited to only six.

Figure 5:
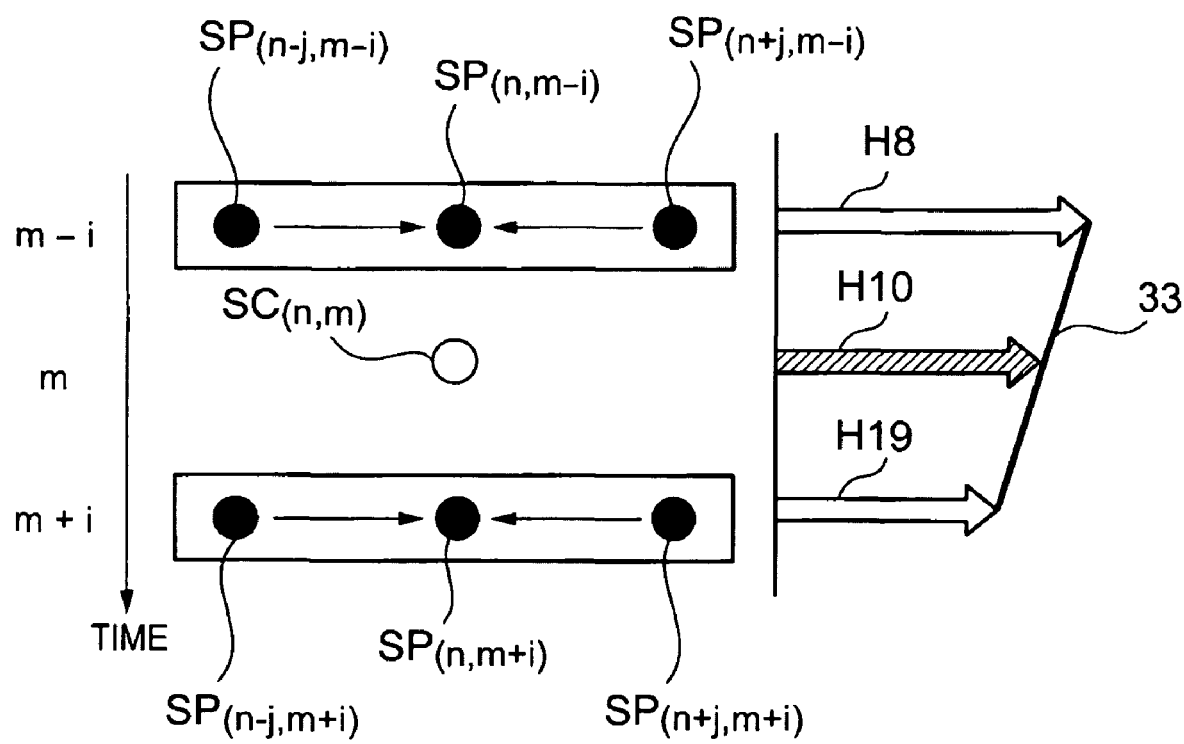
FIG. 5 is a conceptual diagram of a carrier symbol filter 29 related to the present invention.

FIG. 5 is a conceptual diagram of the carrier symbol filter 29. SC (n, m) is an observation carrier of a carrier signal segment object for correction. The carrier symbol filter 29 as illustrated shows each of three synchronizing signals apiece, for example, in positions separated to i symbol in the previous and subsequent time axis direction from a symbol number SC (n, m). Namely, a linear interpolation of SP (n−j, m−i), SP (n, m−i), SP (n+j, m−i) and linear interpolation of SP (n−j, m+i), SP (n, m+i) and SP (n+j, m+i) is effected. A predictive value H10 of the transmission characteristic for the observation carrier SC (n, m) designated as a carrier signal segment object for correction is acquired from the point above the straight line 33 which connects the results (a first predictive value H8, a second predictive value H9) of these two linear interpolations. At this point, as for SP (n, m−i) and SP (n, m+i), the i symbol is separated in the previous and subsequent time axis direction from the symbol number m of SC (n, m) and becomes a synchronizing signal arranged in the same position to the frequency axis direction.

A predicted value is outputted from the carrier symbol filter 29 as a signal correction coefficient.

Here, the first predictive value H8 is an interpolation result of three synchronizing signals in m−i symbols. The second predictive value H9 is an interpolation result of three synchronizing signals in m+i symbols. Therefore, the first predictive value H8 and the second predictive value H9 are both interpolation results of each frequency axis direction of all m−i symbols and m+i symbols. In addition, the predictive value H10 executes based on the first predictive value H8 and the second predictive value H9 which is acquired as an interpolation result between different symbols (m−i symbols and m+i symbols), that is, an interpolation result in a time axis direction). Ultimately, the carrier symbol filter 29 will execute not only in a frequency axis direction (carrier direction), but interpolation in a time axis direction (symbol direction) as well.

In the carrier symbol filter of the above-mentioned FIG. 5, it is regarded that the synchronizing signals of i symbol separate SP (n, m−i) and SP (n, m+i) in the previous and subsequent time axis direction from symbol number m of a carrier SC (n, m) designated as a carrier signal segment object for correction and positions them in the same position to the frequency axis direction. By linear interpolation of three synchronizing signals of the same symbol in which i symbol separates in the previous and subsequent time axis direction from a symbol number m of carrier SC (n, m), a value is calculated of the above-mentioned data carrier and the time axis direction is interpolated based on the value of this calculated data carrier.

Although the above-stated first predictive value and the second predictive value formed the interpolation result of three synchronizing signals, the number of synchronizing signals is not limited to only three.

Furthermore, although linear interpolation is performed on symbols in positions separated the same interval of only i in the previous and subsequent time axis direction relative to a carrier designated as a carrier signal segment object for correction, a previous symbol and subsequent symbol at a different interval in the time axis direction from a carrier designated as a carrier signal segment object for correction can be employed. Namely, a previous symbol separated at an interval of only i ahead of the time axis direction and a subsequent symbol separated at an interval of only k behind the time axis direction from a carrier signal segment object for correction may be used.

The selection circuit section 31 selects at least one side of the predictive value H7 of the carrier filter 28 and the predictive value of the carrier symbol filter 29 and then outputs this selection result to the equivalence circuit section 32 as signal correction coefficients. In other words, with regard to each of the predictive value H7 of the carrier filter 28 and the predictive value H10 of the carrier symbol filter 29, the composite value (H7×Wa+H10×Wb) with the predetermined weight values (Wa, Wb) applied is generated in the weighting circuit section 30 and the selection result is outputted to the equivalence circuit section 32 as signal correction coefficients.

This selection operation is executed corresponding to three determination results (L, M, S) outputted from the judgment circuit section 27. Namely, when a determination result is L, the operation presumes that the time variation of a data signal is high and the predictive value H7 of the carrier filter 28 is selected; when a determination result is S, the operation presumes that the time variation of a data signal is low and the predictive value H10 of the carrier symbol filter 29 is selected; or when a determination result is M, the composite value (H7×Wa+H10×Wb) with the predetermined weight values (Wa, Wb) applied to the predictive value of both filters (the carrier filter 28 and the carrier symbol filter 29) is selected.

The equivalence circuit section 32 implements division of the carrier domain signal outputted from the FFT section 15 using these signal correction coefficients and rectifies the amplitude and phase of a carrier signal segment object for correction according to a predicted transmission characteristic, in short, amplitude equivalence and phase equivalence, of a data carrier (carrier signal segment object for correction) with a non-inserted synchronizing signal.

In the above configuration, the next operation is acquired in the waveform equivalence section 16 which contains the distinctive particulars of the embodiment. Specifically, when a synchronizing signal is extracted by the synchronizing signal extraction section 23 is each other inputted into the previous symbol composite circuit section 24, the subsequent symbol composite circuit section 25, the carrier filter 28 and the carrier symbol filter 29, the amount of variation in the symbol direction (time axis direction) is judged by the previous symbol composite circuit section 24, the subsequent symbol composite circuit section 25, the difference calculation circuit section 26 and the judgment circuit section 27 in three steps (L, M, S). Following this determination result, at least one side of the predictive value H7 of the carrier filter 28 or the predictive value H10 of the carrier symbol filter and either of the weight composite values (H7×Wa+H10×Wb) in the predictive values H7 and H10 is selected in the selection circuit section 31. This selection result is then supplied to the equivalence circuit section 32 to perform an adjustment in the frequency axis direction in the carrier filter 28 and to accomplish amplitude equivalence and phase equivalence of an observation carrier.

Here, when variation in the symbol direction is high (determination result=L of the-judgment circuit section 27), the predictive value H7 of the carrier filter 28 is selected and supplied to the equivalence circuit section 32. The predictive value H7, as shown in FIG. 4, is a predicted value based on six synchronizing signals in the same symbol number m as an observation carrier SC (n, m) [SP (n−3, m), SP (n−2, m), SP (n−1, m), SP (n+1, m), SP (n+2, m) and SP (n+3, m)] and an interpolation result in the time axis direction is not included. Therefore, since equivalence is accomplished only using a predicted result in a carrier direction, when variation in the symbol direction is high (determination result=L of the judgment circuit section 27), the effects of variation in the symbol direction can be excluded and equivalence accuracy can be improved.

Meanwhile, when variation in the symbol direction is low (determination result=S of the judgment circuit section 27), a predictive value H10 of the carrier symbol filter 29 is selected and supplied to the equivalence circuit section 32. The predictive value H10 interpolates two frequency interpolation results in the time direction. Accordingly, as shown in FIG. 5, the first predictive value H8 which interpolated three synchronizing signals [SP (n−j, m−i), SP (n, m−i), SP (n+j, m−i)] of the previous i symbol of an observation carrier [SC (n, m)] in the carrier direction (frequency axis direction); and the second predictive value H9 which interpolated three synchronizing signals [SP (n−j, m+i), SP (n, m+i), SP (n+j, m+i)] of the subsequent i symbol of an observation carrier [SC (n, m)] in the carrier direction is interpolated in the symbol direction. Therefore, when variation in the symbol direction is low (determination result=S of the judgment circuit section 27), since both interpolation results in the carrier direction and the symbol direction are included the equivalence accuracy can be improved.

Otherwise, when the amount of variation in the symbol direction is medium (determination result=M of the judgment circuit section 27), the composite value (H7×Wa+H10×Wb) with the predetermined weight values applied to the predictive value H7 of the carrier filter 28 and the predictive value H10 of the carrier symbol filter 29 is selected and supplied to the equivalence circuit section 32. In this instance, equivalence accuracy similarly can be improved by adjusting the weight values (Wa, Wb).

In accordance with the invention in the embodiment, based on the amount of variation in the correction value of a carrier in the time axis direction, at least one or the other among the prediction results of a first prediction means and the prediction result of a second prediction means and either of the weight composite values of the predictive values is selected by a selection means and waveform equivalence of a carrier within a symbol outputted from a transform means using this selection result is performed. Here, the first prediction means executes interpolation exclusively of the frequency axis direction. Meanwhile, the second prediction means executes interpolation of the frequency axis direction of the synchronizing signal in a plurality of different symbols and interpolation of the time axis direction using those interpolation results.

Accordingly, at least one or the other among the prediction results of a first prediction means and the prediction result of a second prediction means or either of the weight composite values of those predictive values can be combined and executed according to the amount of variation in the correction value of a carrier in the time axis direction. Thus, an OFDM demodulator can be provided which is not easily influenced by amplitude variations on the time axis caused by multipath interference, fading or phase fluctuations.

In addition, the above-stated selection means selects a prediction result of the above-mentioned first prediction means when a variation of the correction value of a carrier is high in the time axis direction detected by the above-mentioned detection means or when a variation of the correction value of a carrier in the time axis direction detected with the above-described detection means is low, a prediction result of the above-mentioned second prediction means is selected. Otherwise, when a variation of the correction value of a carrier in the time axis direction detected with the above-described detection means is a moderate range, the composite value with each of the weight values applied to the prediction result of the above-mentioned first prediction means and the prediction result of the above-mentioned second prediction means is selected. In this manner, the present invention makes it feasible to select a waveform equivalence means suitable for the amount of variation of the correction value of a carrier in the time axis direction and waveform equivalence accuracy can be markedly elevated.

MODIFIED EXAMPLE 1

Figure 6:
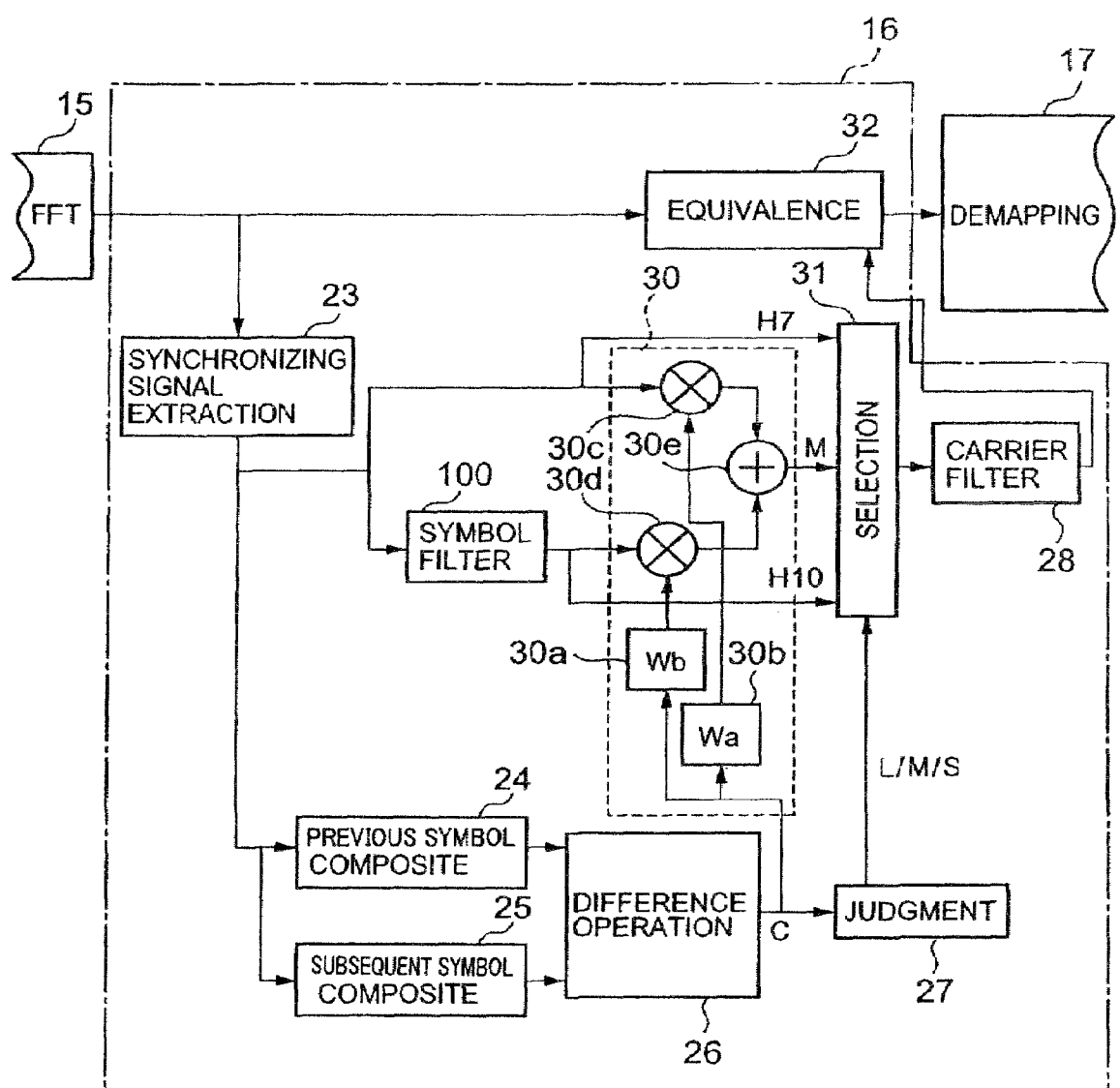
FIG. 6 is a block diagram showing a modified example 1 of a waveform equivalence section 16 related to the present invention.

FIG. 6 is a block diagram showing a modified example 1 of the waveform equivalence section 16 in FIG. 2A. In FIG. 6, the specific differences from FIG. 2A are that the carrier filter 28 is moved from the arrangement position in FIG. 2A and relocated to perform direct input of the output of the synchronizing signal extraction section 23 via the weighting circuit section 30, transposed the carrier symbol filter 29 to a symbol filter 100, and inserted the carrier filter 28 between the selection circuit section 31 and the equivalence circuit section 32. Also, concerning all configuration equivalents in comparison to FIG. 2A, except for the symbol filter 100, the same nomenclature and element numbers are appended as in the original embodiment.

Figure 7:
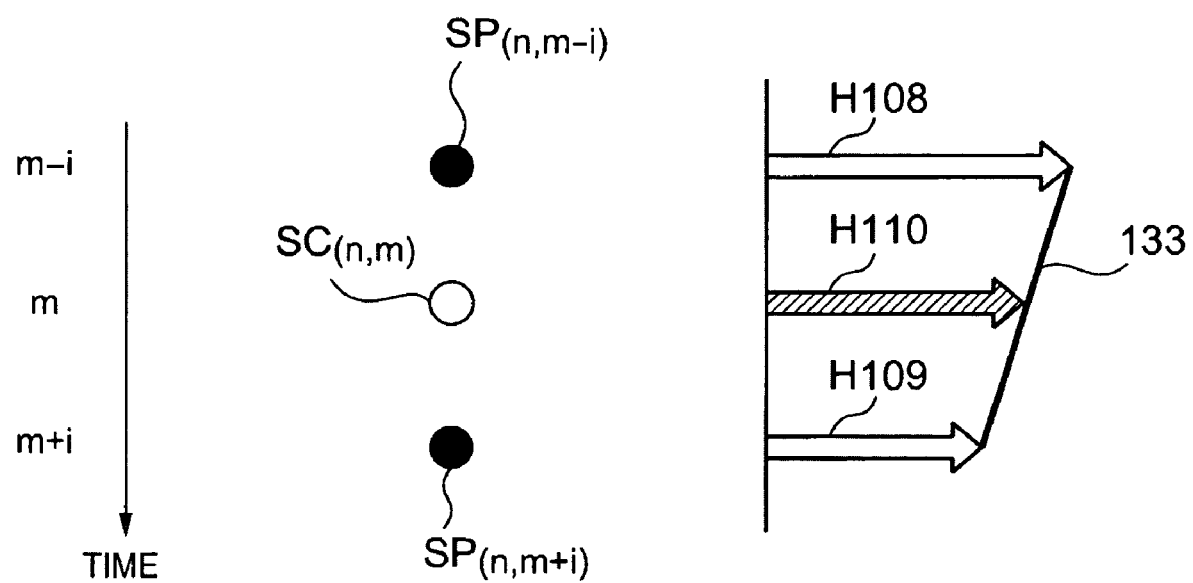
FIG. 7 is a conceptual diagram of a symbol filter 100 in modified example 1 related to the present invention.

FIG. 7 is a conceptual diagram of a symbol filter 100. SC (n, m) is designated as an observation carrier of a carrier signal segment object for correction. As associated with a straight line 133, a symbol filter 100 acquires a transmission characteristic H108 of the synchronizing signal SP (n, m−1) and a transmission characteristic H109 of the synchronizing signal (SP (n, m+1) positioned separately in the previous and subsequent i symbols of the time axis direction from a symbol number m of SC (n, m), as well as a predictive value H110 of the transmission characteristic of an observation carrier SC (n, m) designated as a carrier signal segment object for correction from a point on the straight line 133 and outputs the signal correction coefficients.

Although the transmission characteristic is calculated using linear interpolation relative to a symbol positioned separating only i at the same interval in the previous and subsequent time axis direction, a previous symbol and subsequent symbol at a different interval in the time axis direction from a carrier designated as a carrier signal segment object for correction can be employed. Namely, a previous symbol separated at an interval of only i ahead of the time axis direction and a subsequent symbol separated at an interval of only k behind the time axis direction from a carrier signal segment object for correction may be used.

Furthermore, when the predictive value of the transmission characteristic of a carrier SC (n, m) designated as a carrier signal segment object or correction is calculated, the carrier SC (n, m) can be changed into the above-described synchronizing signal SP (n, m−i) or the synchronizing signal SP (n, m+i) and the predictive value of the transmission characteristic of a carrier of another designated carrier signal segment object for correction can be acquired.

The selection circuit section 31 selects a synchronizing signal outputted from the synchronizing signal extraction section 23 and at least one side of the predictive value H110 of the symbol filter 100 and then outputs upon forming the selection result into signal correction coefficients to the carrier filter 28. Otherwise, a composite value (synchronizing signal×Wa+H110×Wb) by each of a synchronizing signal outputted from the synchronizing signal extraction section 23 and the predictive value H110 of the symbol filter 100 with application of the predetermined weight values (Wa, Wb) generated by the weighting circuit section 30 is selected and then outputted upon forming the selection result into signal correction coefficients to the carrier filter 28.

The above-stated selection operation is performed corresponding to three determination results (L, M, S) outputted from the judgment circuit section 27. In other words, when a determination result is L, which is deemed as high in time variation of a data signal and outputted from the synchronizing signal extraction section 23, the synchronizing signal is selected. When a determination result is S, which is deemed as low in time variation of a data signal, the predictive value H110 of the symbol filter 100 is selected. When a determination result is a moderate range, a composite value (synchronizing signal×Wa+H110×Wb) of a synchronizing signal outputted from the synchronizing signal extraction section 23 and the predictive value H110 of the symbol filter 100 with application of the weight values (Wa, Wb) is selected.

The carrier filter 28 corrects the frequency axis direction relative to the signal coefficients outputted from the selection circuit section 31 and outputs to the equivalent circuit section 32.

The equivalence circuit section 32 implements division of the carrier domain signal outputted from the FFT section 15 using these signal correction coefficients and rectifies the amplitude and phase of a carrier segment object for correction according to a predicted transmission characteristic, that is, amplitude equivalence and phase equivalence, of a data carrier (carrier signal segment object for correction) with a non-inserted synchronizing signal.

Figure 8:
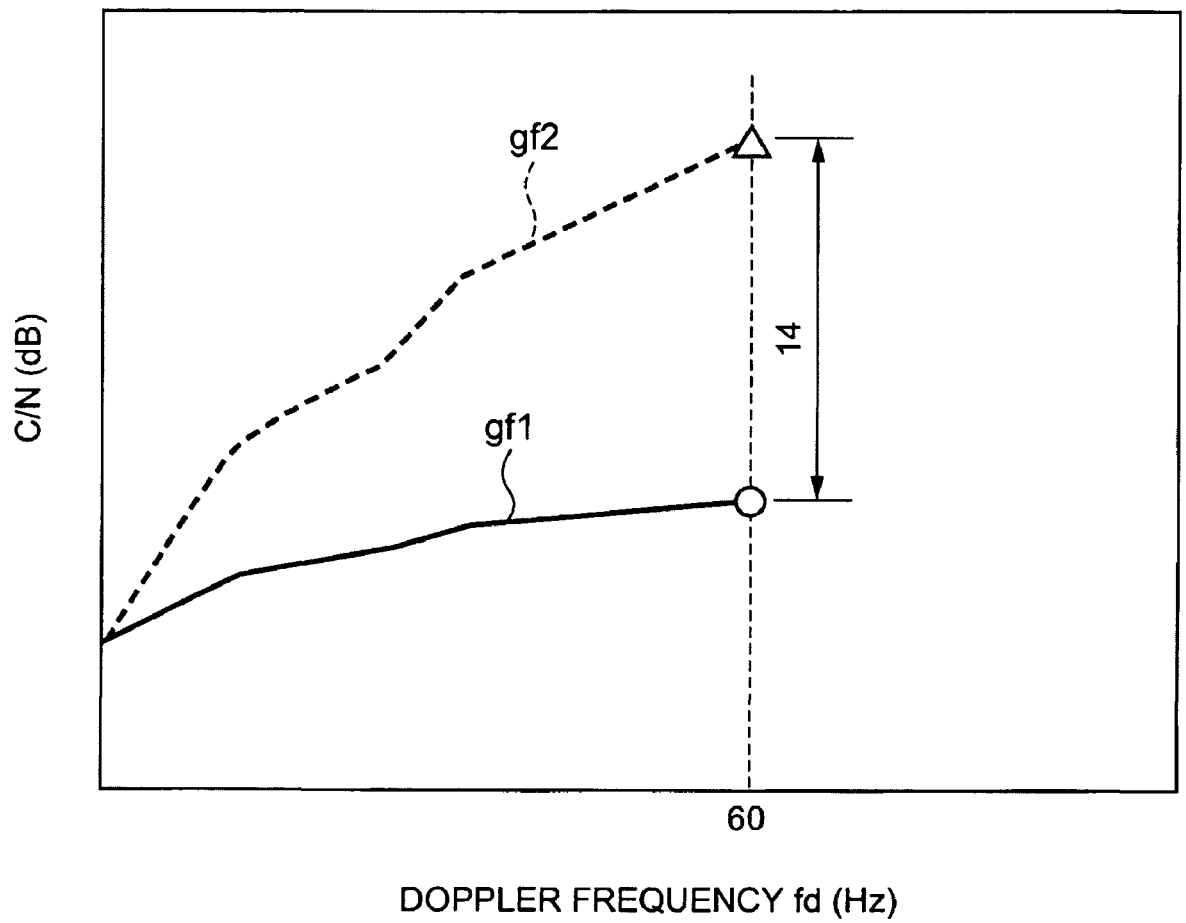
FIG. 8 is a characteristic diagram showing relationship between a Doppler frequency fd and C/N assuming a case where an OFDM demodulator received shifting in modified example 1 related to the present invention.

FIG. 8 is a characteristic diagram showing relationship between a Doppler frequency fd and C/N assuming a case where an OFDM demodulator received shifting. Here, gf1 is a Carrier to Noise (C/N) ratio characteristic in the above-mentioned modified example 1 and gf2 is the C/N characteristic in a conventional terrestrial digital broadcasting demodulator circuit. Based on FIG. 8, when the above-mentioned modified example is used and the Doppler frequency is 60 Hz, the C/N ratio improves improved by 14 dB as compared with a conventional terrestrial digital broadcasting demodulator circuit.

In the configuration of the modified example 1, the next operation is acquired in the waveform equivalence section 16 which has a particular characteristic. Specifically, when a synchronizing signal extracted by the synchronizing signal extraction section 23 is each other inputted into the previous symbol composite circuit section 24, the subsequent symbol composite circuit section 25 and the symbol filter 100, the amount of variation in the symbol direction (time axis direction) is judged by the previous symbol composite circuit section 24, the subsequent symbol composite circuit section 25, the difference calculation circuit section 26 and the judgment circuit section 27 in three steps (L, M, S). According to this determination result, a synchronizing signal outputted from the synchronizing signal extraction section 23 or at least one side of the predictive value H110 of the symbol filter 100 or a synchronizing signal and either of the weight composite values (synchronizing signal×Wa+H110×Wb) of the predictive value H110 is selected by the selection circuit section 31. This selection result is then supplied to the equivalence circuit section 32 to perform an adjustment in the frequency axis direction in the carrier filter 28 and to accomplish amplitude equivalence and phase equivalence of an observation carrier.

Here, when a variation in the symbol direction (time axis direction) is high (determination result=L of the judgment circuit section 27), a synchronizing signal extracted by the synchronizing signal extraction section 23 is selected in the selection circuit section 31 and only frequency axis correction is executed by the carrier filter 28 with regard to this selected synchronizing signal. Therefore, when a variation in the symbol direction is high, equivalence accuracy can be improved as prediction of symbol direction is not carried out.

Conversely, when a variation in the symbol direction is low (determination result=S of the judgment circuit section 27), the predictive value H110 of the symbol filter 100 is selected in the selection circuit section 31 and also frequency axis correction is executed in the carrier filter 28. Therefore, when a variation within direction is low, by sequentially executing prediction in the symbol direction (time axis direction) and the carrier direction (frequency axis direction) equivalence accuracy can be further improved.

Additionally, when the amount of variation in the symbol direction is moderate (determination result=M of the judgment circuit section 27), a composite value (synchronizing signal×Wa+H110×Wb) of a synchronizing signal extracted by the synchronizing signal extraction section 23 and the predictive value H110 of the symbol filter 100 with application of the predetermined weight value is selected and supplied to the carrier filter 28. In this case, equivalence accuracy can be similarly improved by adjusting the weight values (Wa, Wb).

Accordingly, modified example 1 is based on the amount of variation of the correction value of a carrier in the time axis direction of at least among a correction value predicted by a synchronizing signal extracted by an extraction means and a time axis prediction means, as well as either of the weight composite values is selected. In this manner, waveform equivalence of a data signal comprised from a carrier of a symbol unit outputted from a transform means using a corrected result in the frequency axis direction of this selection result is achieved.

Since either one of the weight composite values or at least among the correction values predicted by a synchronizing signal extracted by an extraction means and a time axis prediction means can be combined and executed corresponding to the amount of variation of a correction value of a carrier in the time axis direction, an OFDM demodulator can be provided which is not easily influenced by amplitude variations on the time axis caused by multipath interference, fading or phase fluctuations.

The above-mentioned selection means selects a synchronizing signal by the above-mentioned extraction means when a variation of the correction value of a carrier in the time axis direction is detected as high by the above-stated detection means; or selects the correction value predicted by the above-mentioned time axis prediction means when a variation of the correction value of a carrier in the time axis means is detected as low by the above-stated detection means; or selects a composite value of a synchronizing signal extracted by the above-mentioned extraction means and the above-mentioned time axis prediction means when a variation of the correction value of a carrier in the time axis direction is detected as moderate by the above-stated detection means. In this manner, the present invention makes it feasible to select a waveform equivalence means suitable for the amount of variation of the correction value of a carrier in the time axis direction and waveform equivalence accuracy can be markedly elevated.

MODIFIED EXAMPLE 2

Figure 9:
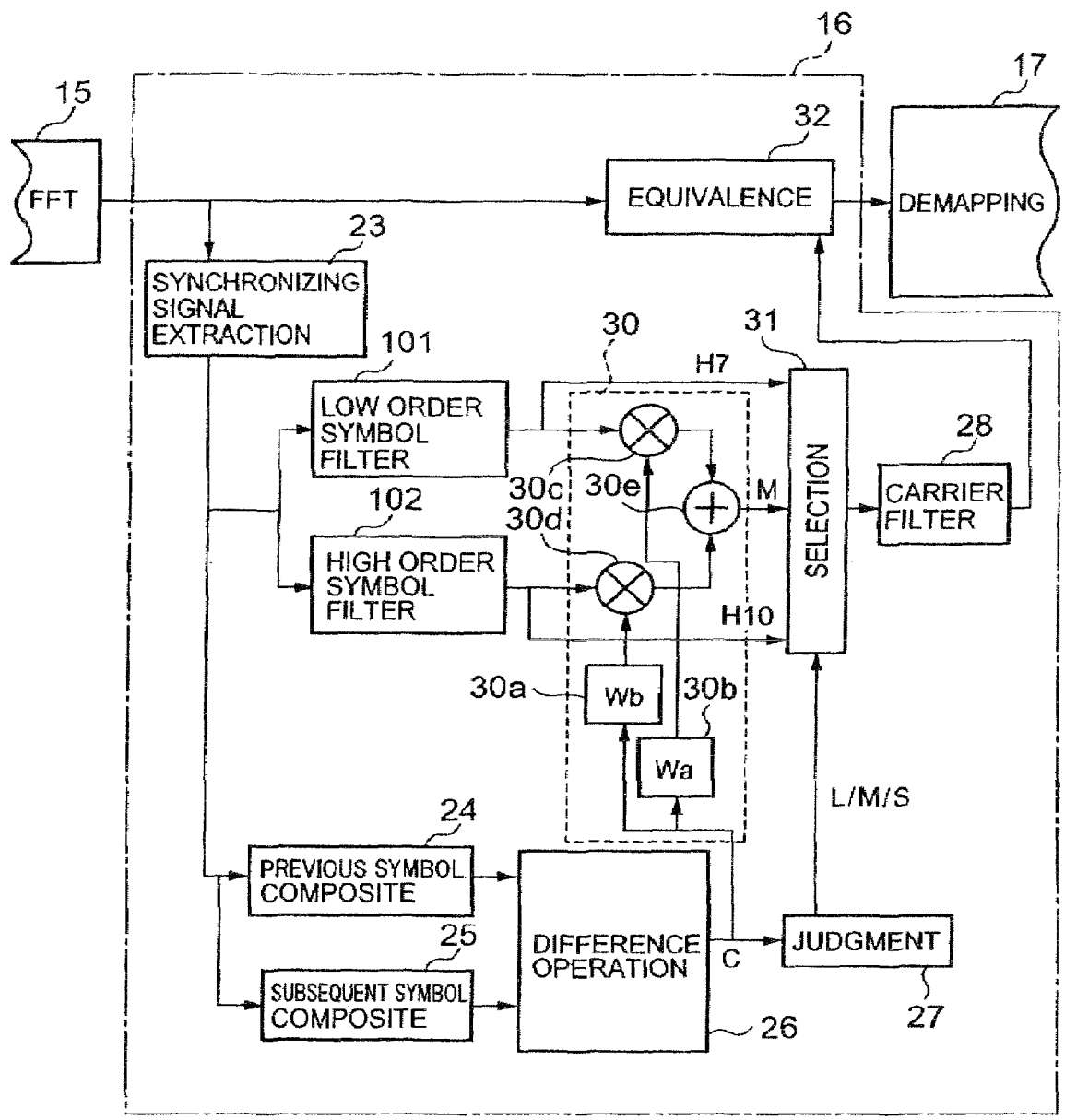
FIG. 9 is a block diagram showing a waveform equivalence section 16 in modified example 2 related to the present invention.

FIG. 9 is a block diagram showing the waveform equivalence section 16 in FIG. 2A of the modified example 2. In FIG. 9, the specific differences from FIG. 2A are that the carrier filter 28 is displaced from the arrangement position in FIG. 2A and replaced with a low order symbol filter 101, the carrier symbol filter 29 is replaced with a high order symbol filter 102 and the carrier filter 28 is now inserted between the selection circuit section 31 and the equivalence circuit section 32. Additionally, concerning all configuration equivalents in comparison to FIG. 2A, except for the low order symbol filter 101 and the high order symbol filter 102, the same nomenclature and element numbers are appended as in the original embodiment.

Figure 10:
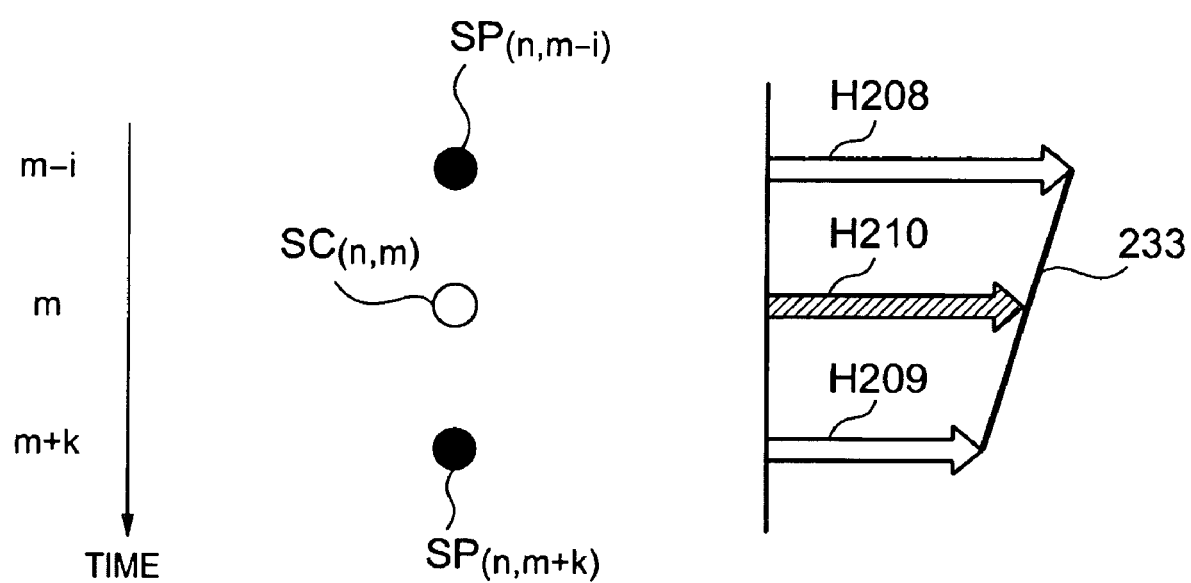
FIG. 10 is a conceptual diagram of the low order symbol filter 101 in modified example 2 related to the present invention.

FIG. 10 is a conceptual diagram of the low order symbol filter 101. SC (n, m) is designated as an observation carrier of a carrier signal segment object for correction. As associated with a straight line 233, a low order symbol filter 101 acquires a transmission characteristic H208 of the synchronizing signal SP (n, m−i) positioned separating the subsequent i symbol in the time axis direction and a transmission characteristic H209 of the synchronizing signal SP (n, m+k) positioned separating the previous k symbol in the time axis direction from a symbol m of SC (n, m). In addition, the transmission characteristic of the predictive value H210 of the observation carrier SC (n, m) designated as a carrier signal segment object for correction is acquired from a point on the straight line 233 and outputs the signal correction efficients.

Thus, since the low order symbol filter 101 predicts the transmission characteristic of a carrier signal segment object for correction using two synchronizing signals separated in the time axis direction to the carrier SC (n, m) of a carrier signal segment object for correction, the low order symbol filter 101 serves as a secondary symbol filter.

Although the low order symbol filter 101 predicts the transmission characteristic of a correction carrier from two synchronizing signals, the synchronizing signals are not limited only to a quantity of two, for example, instead consisting of zero, four, six, . . . synchronizing signals. Here, in the case of zero, a synchronizing signal which is separated in the time axis direction relative to the carrier SC (n, m) of a carrier signal segment for correction does not exist and prediction of the transmission characteristic of the carrier designated a carrier signal segment for correction is not performed. For example, in FIG. 6, it is supposed that a $0^{th}$ order symbol filter exists between the synchronizing signal extraction section 23 and the weighting circuit section 30.

Calculation is also effective in a transmission characteristic using linear interpolation with respect to a symbol in positions separated at the same interval of only i in the previous and subsequent time axis direction from the carrier SC (n, m) for a carrier signal segment object for correction.

When a predictive value of the transmission characteristic of the carrier SC (n, m) is designated a carrier signal segment object for correction is calculated, the carrier SC (n, m) can be changed into the above-mentioned synchronizing signal SP (n, m−i) or the synchronization signal SP (n, m+k). Thus, a predictive value of the transmission characteristic of a carrier for another designated carrier signal segment object for correction can be acquired.

Figure 11:
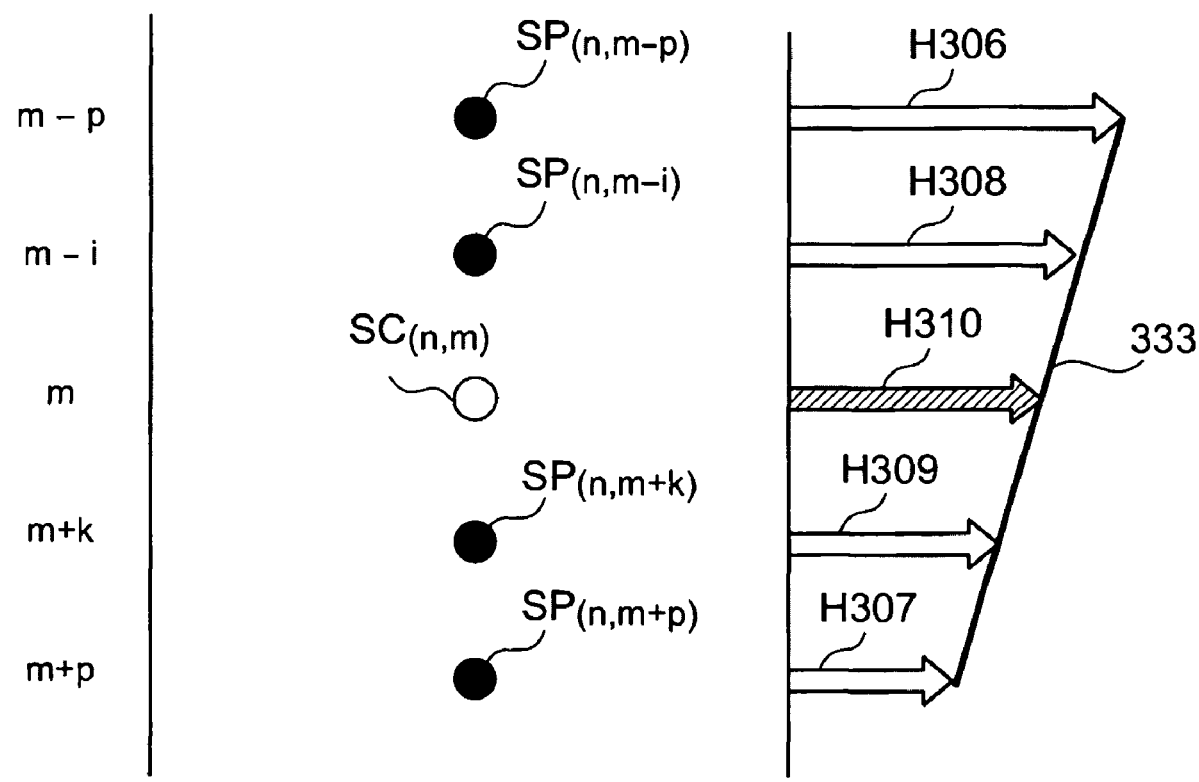
FIG. 11 is a conceptual diagram of the high order symbol filter 102 in modified example 2 related to the present invention.
Figure 12:
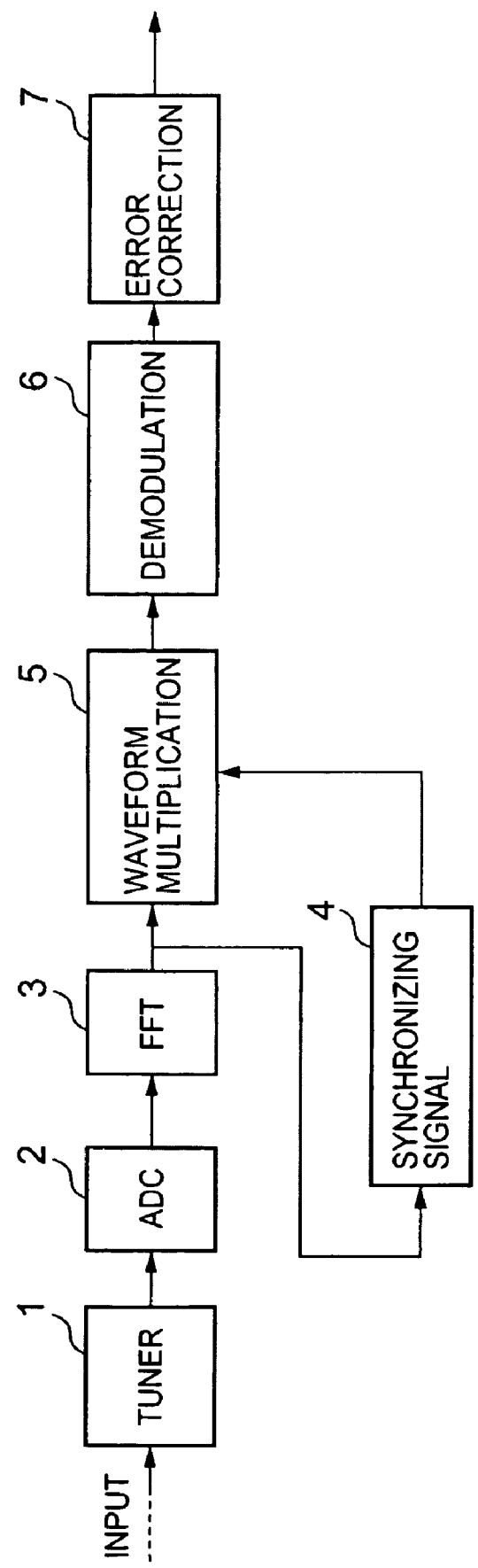
FIG. 12 is a line block diagram of a demodulator circuit proposed for use in a conventional terrestrial digital broadcasting receiver.

FIG. 11 is a conceptual diagram of the high order symbol filter 102. SC (n, m) is designated as an observation carrier of a carrier signal segment object for correction. As associated with a straight line 333, a high order symbol filter 102 acquires a transmission characteristic H308 of the synchronizing signal SP (n, m−i) positioned separating the subsequent i symbol in the time axis direction; a transmission characteristic H306 of the synchronizing signal SP (n, m−p) positioned separating the previous p symbol in the time axis direction; a transmission characteristic H309 of the synchronizing signal SP (n, m+k) positioned separating the subsequent k symbol in the time axis direction and a transmission characteristic H307 of the synchronizing signal SP (n, m+p) positioned separating the subsequent p symbol in the time axis direction from the symbol m of SC (n, m). In addition, the transmission characteristic of the predictive value H310 of the observation carrier SC (n, m) is acquired from a point on the straight line 333 and outputs the signal correction efficients.

Thus, since the high order symbol filter 102 predicts the transmission characteristic of a carrier designated as a carrier signal segment object for correction using four synchronizing signals separated in the time axis direction from carrier SC (n, m) of a carrier signal segment object for correction, the high order symbol filter 102 serves as a $4^{th}$ (fourth) symbol filter.

Although the high order symbol filter 101 predicts the transmission characteristic of a correction carrier based on linear interpolation in four synchronizing signals, the synchronizing signals are not limited only to a quantity of four, for example, instead consisting of six, eight, . . . synchronizing signals and may be another higher order interpolation in which the order is higher than the order of the low order symbol filter 101.

When a predictive value of the transmission characteristic of the carrier SC (n, m) is designated a carrier signal segment object for correction is calculated, the carrier SC (n, m) can be changed into the above-mentioned signals SP (n, m−i), SP (n, m+k), SP (n, m−p) or SP (n, m+p) and a predictive value of the transmission characteristic for another designated carrier signal segment object for correction can be acquired.

The selection circuit section 31 selects at least one side of the predictive value H210 of the low order symbol filter 101 and the predictive value H310 of the high order symbol filter 102 and then outputs the selection result as signal correction coefficients to the carrier filter 28. Or else a composite value (H210×Wa+H310×Wb) to each of the predictive value H210 outputted from the low order symbol filter 101 and the predictive value H310 outputted from the high order filter 102 with the application of the predetermined weight values (Wa, Wb) generated in the weighting circuit section 30 is selected and then outputs the selection result as signal correction coefficients to the carrier filter 28.

These selection operations are performed corresponding to three determination results (L, M, S) outputted from the judgment circuit section 27. Namely, when a determination result is L, which is deemed as high in time variation of a data signal, the predictive value H210 outputted from the low order symbol filter 101 is selected; when a determination result is S, which is deemed as low in time variation of a data signal, the predictive value H310 outputted from the high order symbol filter is selected; or else when a determination result is a moderate range, a composite value (H210×Wa+H310×Wb) of the predictive value H210 outputted from the low order symbol filter 101 and the predictive value H310 of the high order symbol filter 102 with the application of the weight values (Wa, Wb) is selected.

The carrier filter 28 corrects the frequency axis direction relative to the signal coefficients outputted from the selection circuit section 31 and outputs to the equivalent circuit section 32.

The equivalence circuit section 32 implements division of the carrier domain signal outputted from the FFT section 15 using these signal correction coefficients and rectifies the amplitude and phase of a carrier segment object for correction according to a predicted transmission characteristic, that is, amplitude equivalence and phase equivalence, of a data carrier (carrier signal segment object for correction) with a non-inserted synchronizing signal.

In the configuration of the modified example 2, the next operation is acquired in the waveform equivalence section 16 which has a particular characteristic. Specifically, when a synchronizing signal extracted by the synchronizing signal extraction section 23 is each other inputted into the previous symbol composite circuit section 24, the subsequent symbol composite circuit section 25, the low order symbol filter 101 and the high order symbol filter 102, the amount of variation in the symbol direction (time axis direction) is judged by the previous symbol composite circuit section 24, the subsequent symbol composite circuit section 25, the difference calculation circuit section 26 and the judgment circuit section 27 in three steps (L, M, S). According to this determination result, at least one side of the predictive value H210 outputted from the low order symbol filter 101 or the predictive value H310 outputted from the high order symbol filter 102; or else a composite value (H210×Wa+H310×Wb) of any of the predictive value H210 or predictive value H310 is selected in the selection circuit section 31. This selection result is then supplied to the equivalence circuit section 32 to perform an adjustment in the frequency axis direction in the carrier filter 28 and to accomplish amplitude equivalence and phase equivalence of an observation carrier.

Here, when a variation in the symbol direction (time axis direction) is high (determination result=L of the judgment circuit section 27), the low order symbol filter 101 is selected in the selection circuit section 31 and frequency axis correction is executed by the carrier filter 28 with regard to this selected predictive value H210. Therefore, when a variation in the symbol direction is high, the effects of variation in the low order symbol filter 101 can be excluded and equivalence accuracy can be improved.

Conversely, when a variation in the symbol direction is low (determination result=S of the judgment circuit section 27), the predictive value H310 of the high order symbol filter 102 is selected in the selection circuit section 31 and then frequency axis correction is executed in the carrier filter 28. Therefore, when a variation within direction is low, by executing prediction in the time axis direction using the order of the high order symbol filter 102, frequency axis direction is predicted and equivalence accuracy can be further improved.

Additionally, when the amount of variation in the symbol direction is moderate (determination result=M of the judgment circuit section 27), a composite value (H210×Wa+H310×Wb) of the predictive value H210 outputted from the low order symbol filter 101 and the predictive value H310 outputted from the high order symbol filter 102 with application of the predetermined weight value is selected and supplied to the carrier filter 28. In this case, equivalence accuracy can be similarly improved by adjusting the weight values (Wa, Wb).

Accordingly, modified example 2 is based on the amount of variation of the correction value of a carrier in the time axis direction of at least one time axis filtration means among a plurality of time axis filtration means and either of the weight composite values relative to a correction value of a carrier predicted by a plurality of time axis filter means is selected. In this manner, waveform equivalence of a data signal transformed by a transform means using a correction result in the frequency axis direction of this selection result is achieved. While being able to select a waveform equivalence means suitable for the amount of time variation of the correction value of a carrier in the time axis direction and being able to improve waveform equivalence accuracy, an OFDM demodulator can be provided which is not easily influenced by amplitude variations on the time axis caused by multipath interference, fading or phase fluctuations.

In the embodiment, although a determination result of the judgment circuit section 27 is made into three steps, this invention is not restricted by this. For example, when there is two steps of a case of high and low variations of the symbol direction. In this event, the weighting circuit section 30 is unnecessary and the selection circuit section 31 needs only to suitably select an output of the carrier filter 28 and the output of the carrier symbol filter 29 according to the situation; or suitably select output of the synchronizing signal extraction section 23 and the output of the symbol filter 100 according to the situation; or suitably select the output of the low order symbol filter 101 and the output of the low order symbol filter 102 according to the situation.

Furthermore, in the embodiment, the difference of the output of the previous symbol composite circuit section 24 and the output of the subsequent symbol composite circuit section 25 is calculated in the difference calculation circuit section 26. In the judgment circuit section 27, "a case where the variation of a symbol direction is high" or "a case where the variation of a symbol direction is low" and the like are judged as compared with the difference and predetermined threshold values (α, β) and suitably selects the output of the carrier filter 28 and the output of the carrier symbol filter 29 according to those determination results; or else suitably selects the output of a synchronizing signal extraction section 23 and the output of the symbol filter 100 or the output of the low order symbol filter 101 and the output of the high order symbol filter 102, but the present invention is not limited to these embodiments. For example, judging whether or not a previous or subsequent symbol in the symbol direction fluctuating in terms of time is observed by selecting the output of the carrier symbol filter 29 when not fluctuating in terms of time and selecting the output of the carrier filter 28 when fluctuating in terms of time; or selecting the output of the symbol filter 100 when not fluctuating in terms of time and selecting the output of the synchronizing signal extraction section 23; or selecting the output of the high or symbol filter 102 when not fluctuating in terms of time and selecting the output of the low order symbol filter 101. Furthermore in this case, the operation could judge whether or not two values fluctuate in terms of time when the medium (that is, a quantity which fluctuates in terms of time at a moderate level) is also be judged and the medium determination result is obtained, along with the same weighting as the above-described embodiment and designed to select the weighting composite values.

While the present invention has been described with reference to the preferred embodiments, it is intended that the invention be not limited by any of the details of the description thereof.

As this invention can be embodied in several forms without departing from the spirit of the essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are intended to be embraced by the claims.

What is claimed is:

1. An Orthogonal Frequency Division Multiplexing (OFDM) demodulator for demodulating an OFDM signal, an OFDM symbol defining a transmission unit of the OFDM signal being produced by dividing data streams into a plurality of carriers which are within a predetermined bandwidth and which are modulated with orthogonal modulation and discretely inserting a synchronizing signal with known power and known phase in a predetermined carrier, said OFDM demodulator comprising:

transformation means for transforming said OFDM signal into a data signal comprising a carrier of said OFDM symbol;

extraction means for extracting said synchronizing signal from said data signal transformed by said transformation means;

a plurality of time axis filtration means for predicting carrier correction values based on said synchronizing signal contained within said OFDM symbol which is separated in a time axis direction relative to said carrier regarded as a carrier signal segment for correction and for performing correction in a time axis direction of said carrier signal segment for correction;

weighting composite output means for weighting and performing composite output relative to each of said carrier correction values predicted by said plurality of time axis filtration means;

detection means for detecting an amount of time variation in said carrier correction values in said time axis direction based on said synchronizing signal in a plurality of different OFDM symbols;

selection means for selecting at least one of said carrier correction values predicted by at least one of said plurality of time axis filtration means among said carrier correction values predicted by said plurality of time axis filtration means, or a weighting composite value relative to each of said carrier correction values predicted by said plurality of time axis filtration means, based on a detection result of said detection means;

frequency axis prediction means for predicting a correction value in a carrier frequency axis direction of said carrier regarded as said carrier signal segment for correction based on a result selected by said selection means; and waveform equivalence means for performing waveform equivalence of said data signal transformed by said transformation means using a result predicted by said frequency axis prediction means.

2. The OFDM demodulator according to claim 1, wherein said plurality of time axis filtration means comprise:

high order time axis filtration means for predicting a high order carrier correction value based on said synchronizing signal contained within a first number of said OFDM symbols, which are separated from and previous and subsequent in said time axis direction to said carrier regarded as said carrier signal segment for correction and for performing correction in said time axis direction of said carrier signal segment for correction; and low order time axis filtration means for predicting a lower order carrier correction value based on said synchronizing signal contained within a second number of said OFDM symbols, which are separated from and previous and subsequent in said time axis direction to said carrier regarded as said carrier signal segment for correction and for performing correction in said time axis direction of said carrier signal segment for correction, wherein the second number is less than the first number.

3. The OFDM demodulator according to claim 2, wherein said low order time axis filtration means comprises a $0^{th}$ order OFDM symbol filter.

4. The OFDM demodulator according to claim 1, wherein said weighting composite output means comprises:

first weighting means for increasing a first weighting value whenever a difference value of said OFDM symbol previous and subsequent in a time axis direction increases, and for decreasing said first weighting value whenever said difference value decreases, relative to said carrier regarded as said carrier signal segment for correction; and second weighting means for decreasing a second weighting value whenever said difference value increases, and for increasing said second weighting value when said difference value decreases, relative to said carrier regarded as said carrier signal segment for correction.

5. The OFDM demodulator according to claim 1, wherein said detection means comprises:

first calculation means for calculating a composite value of a plurality of synchronizing signals inserted within said same OFDM symbol;

second calculation means for calculating a composite value of a plurality of synchronizing signals inserted within others of said same OFDM symbol; and judgment output means for judging in a plurality of steps and outputting an amount of correction value time variation in said data signal from a difference of said composite value calculated by said first calculation means and said composite value calculated by said second calculation means.

6. An Orthogonal Frequency Division Multiplexing (OFDM) demodulator for demodulating an OFDM signal, an OFDM symbol defining a transmission unit of the OFDM signal being produced by dividing data streams into a plurality of carriers which are within a predetermined bandwidth and which are modulated with orthogonal modulation and discretely inserting a synchronizing signal with known power and known phase in a predetermined carrier, said OFDM demodulator comprising:

transformation means for transforming said OFDM signal into a data signal comprising a carrier of said OFDM symbol;

extraction means for extracting said synchronizing signal from said data signal transformed by said transformation means;

time axis prediction means for predicting carrier correction values in a time axis direction of said carrier regarded as a carrier signal segment for correction based on said synchronizing signal extracted by said extraction means;

weighting composite output means for weighting and performing composite output relative to each of said carrier correction values of said synchronizing signal extracted by said extraction means and predicted by said time axis prediction means;

detection means for detecting an amount of time variation in said carrier correction values in said time axis direction based on said synchronizing signal in a plurality of different OFDM symbols;

selection means for selecting at least one of said carrier correction values of said synchronizing signal extracted by said extraction means among said carrier correction values predicted by said time axis prediction means, or a weighting composite value relative to said carrier correction values, based on a detection result of said detection means;

frequency axis prediction means for predicting a correction value in a carrier frequency axis direction of said carrier regarded as said carrier signal segment for correction based on a result selected by said selection means; and waveform equivalence means for performing waveform equivalence by dividing said data signal transformed by said transformation means using a result predicted by said frequency axis prediction means.

7. The OFDM demodulator according to claim 6, wherein said weighting composite output means comprises:

first weighting means for increasing a first weighting value whenever a difference value of said OFDM symbol previous and subsequent in a time axis direction increases, and for decreasing said first weighting value whenever said difference value decreases, relative to said carrier regarded as said carrier signal segment for correction; and second weighting means for decreasing a second weighting value whenever said difference value increases, and for increasing said second weighting value whenever said difference value decreases, relative to said carrier regarded as said carrier signal segment for correction.

8. The OFDM demodulator according to claim 6, wherein said detection means comprises:

first calculation means for calculating a composite value of a plurality of synchronizing signals inserted within said same OFDM symbol;

second calculation means for calculating a composite value of a plurality of synchronizing signals inserted within others of said same OFDM symbol; and judgment output means for judging in a plurality of steps and outputting an amount of correction value time variation in said data signal from a difference of said composite value calculated by said first calculation means and said composite value calculated by said second calculation means.

9. The OFDM demodulator according to claim 6, wherein said synchronizing signal extracted by said extraction means is selected whenever there is a high time variation of a correction value detected by said detection means.

10. The OFDM demodulator according to claim 6, wherein said selection means selects a prediction result generated by said time axis prediction means whenever there is a low time variation of a correction value detected by said detection means.

11. The OFDM demodulator according to claim 6, wherein said selection means extracts said synchronizing signal by said extraction means and selects a composite value by applying each weighting value to a prediction result generated by said time axis prediction means whenever there is a medium time variation of a correction value detected by said detection means.

12. An Orthogonal Frequency Division Multiplexing (OFDM) demodulator for demodulating an OFDM signal, an OFDM symbol defining a transmission unit of the OFDM signal being produced by dividing data streams into a plurality of carriers which are within a predetermined bandwidth and which are modulated with orthogonal modulation and discretely inserting a synchronizing signal with known power and known phase in a predetermined carrier, said OFDM demodulator comprising:

transformation means for transforming said OFDM signal into a data signal comprising a carrier of said OFDM symbol;

extraction means for extracting said synchronizing signal from said data signal transformed by said transformation means;

first prediction means for predicting a carrier correction value by interpolating said synchronizing signal in a frequency axis direction within a same said OFDM symbol among synchronizing signals extracted by said extraction means, and for designating a carrier signal segment for correction other than said synchronizing signal within said same OFDM symbol;

second prediction means for predicting a carrier correction value which is regarded as said carrier signal segment for correction other than said synchronizing signal within other OFDM symbols which intervene among said plurality of OFDM symbols by interpolating a prediction result in a time axis direction and for predicting a carrier correction value other than said synchronizing signal within said plurality of OFDM symbols by interpolating said synchronizing signal in said frequency axis direction within a plurality of different symbols among synchronizing signals extracted by said extraction means;

weighting composite output means for weighting and performing composite output relative to each of said carrier correction values predicted by said first prediction means and said second prediction means;

detection means for detecting an amount of time variation in said carrier correction values in said time axis direction based on said synchronizing signal in a plurality of different OFDM symbols;

selection means for selecting at least one of the carrier correction values predicted by said first prediction means and said second prediction means, or a weighting composite value of said carrier correction values, based on a detection result of said detection means; and waveform equivalence means for performing waveform equivalence by dividing said data signal transformed by said transformation means using a result selected by said selection means.

13. The OFDM demodulator according to claim 12, wherein said weighting composite output means comprises:

first weighting means for increasing a first weighting value whenever a difference value of said OFDM symbol previous and subsequent in a time axis direction increases, and for decreasing said first weighting value whenever said difference value decreases, relative to said carrier regarded as said carrier signal segment for correction; and second weighting means for decreasing a second weighting value whenever said difference value increases, and for increasing said second weighting value whenever said difference value decreases, relative to said carrier regarded as said carrier signal segment for correction.

14. The OFDM demodulator according to claim 12, wherein said detection means comprises:

first calculation means for calculating a composite value of a plurality of synchronizing signals inserted within said same OFDM symbol;

second calculation means for calculating a composite value of a plurality of synchronizing signals inserted within others of said same OFDM symbol; and judgment output means for judging in a plurality of steps and outputting an amount of correction value time variation in said data signal from a difference of said composite value calculated by said first calculation means and said composite value calculated by said second calculation means.

15. The OFDM demodulator according to claim 12, wherein said selection means selects a prediction result generated said first prediction means whenever there is a high time variation of a correction value detected by said detection means.

16. The OFDM demodulator according to claim 12, wherein said selection means selects a prediction result generated by said second prediction means whenever there is a low time variation of a correction value detected by said detection means.

17. The OFDM demodulator according to claim 12, wherein said selection means selects a composite value by applying each weighting value to prediction results generated by said first prediction means and said second prediction means whenever there is a medium time variation of a correction value detected by said detection means.

18. An integrated circuit for use in Orthogonal Frequency Division Multiplexing (OFDM) for demodulating an OFDM signal, an OFDM symbol defining a transmission unit of the OFDM signal being produced by dividing data streams into a plurality of carriers which are within a predetermined bandwidth and which are modulated with orthogonal modulation and discretely inserting a synchronizing signal with known power and known phase in a predetermined carrier, said integrated circuit comprising:

a transformation circuit for transforming said OFDM signal into a data signal comprising a carrier of said OFDM symbol;

an extraction circuit for extracting said synchronizing signal from said data signal transformed by said transformation circuit;

a plurality of time axis filtration circuits for predicting carrier correction values based on said synchronizing signal contained within said OFDM symbol which is separated in a time axis direction relative to said carrier regarded as a carrier signal segment for correction and for performing correction in a time axis direction of said carrier signal segment for correction;

a weighting composite output circuit for weighting and performing composite output relative to each of said carrier correction values predicted by said plurality of time axis filtration circuits;

a detection circuit for detecting an amount of time variation in said carrier correction values in said time axis direction based on said synchronizing signal in a plurality of different OFDM symbols;

a selection circuit for selecting at least one of said carrier correction values predicted by at least one of said plurality of time axis filtration circuits among said carrier correction values predicted by said plurality of time axis filtration circuits, or a weighting composite value relative to each of said carrier correction values predicted by said plurality of time axis filtration circuits, based on a detection result of said detection circuit;

a frequency axis prediction circuit for predicting a correction value in a carrier frequency axis direction of said carrier regarded as said carrier signal segment for correction based on a result selected by said selection circuit; and a waveform equivalence circuit for performing waveform equivalence of said data signal transformed by said transformation circuit using a result predicted by said frequency axis prediction circuit.

19. An integrated circuit for use in Orthogonal Frequency Division Multiplexing (OFDM) for demodulating an OFDM signal, an OFDM symbol defining a transmission unit of the OFDM signal being produced by dividing data streams into a plurality of carriers which are within a predetermined bandwidth and which are modulated with orthogonal modulation and discretely inserting a synchronizing signal with known power and known phase in a predetermined carrier, said integrated circuit comprising:

a transformation circuit for transforming said OFDM signal into a data signal comprising a carrier of said OFDM symbol;

an extraction circuit for extracting said synchronizing signal from said data signal transformed by said transformation circuit;

a time axis prediction circuit for predicting carrier correction values in a time axis direction of said carrier regarded as a carrier signal segment for correction based on said synchronizing signal extracted by said extraction circuit;

a weighting composite output circuit for weighting and performing composite output relative to each of said carrier correction values of said synchronizing signal extracted by said extraction circuit and predicted by said time axis prediction circuit;

a detection circuit for detecting an amount of time variation in said carrier correction values in said time axis direction based on said synchronizing signal in a plurality of different OFDM symbols;

a selection circuit for selecting at least one of said carrier correction values of said synchronizing signal extracted by said extraction circuit among said carrier correction values predicted by said time axis prediction circuit, or a weight composite value of the carrier correction values, based on a detection result of said detection circuit;

a frequency axis prediction circuit for predicting a correction value in a carrier frequency axis direction of said carrier regarded as said carrier signal segment for correction based on a result selected by said selection circuit; and a waveform equivalence circuit for performing waveform equivalence of said data signal transformed by said transformation circuit using a result predicted by said frequency axis prediction circuit.

20. An integrated circuit for use in Orthogonal Frequency Division Multiplexing (OFDM) for demodulating an OFDM signal, an OFDM symbol defining a transmission unit of the OFDM signal being produced by dividing data streams into a plurality of carriers which are within a predetermined bandwidth and which are modulated with orthogonal modulation and discretely inserting a synchronizing signal with known power and known phase in a predetermined carrier, said integrated circuit comprising:

a transformation circuit for transforming said OFDM signal into a data signal comprising a carrier of said OFDM symbol;

an extraction circuit for extracting said synchronizing signal from said data signal transformed by said transformation circuit;

a first prediction circuit for predicting a carrier correction value by interpolating said synchronizing signal in a frequency axis direction within a same said OFDM symbol among synchronizing signals extracted by said extraction circuit, and for designating a carrier signal segment for correction other than said synchronizing signal within said same OFDM symbol;

a second prediction circuit for predicting a carrier correction value which is regarded as said carrier signal segment for correction other than said synchronizing signal within other OFDM symbols which intervene among said plurality of OFDM symbols by interpolating a prediction result in a time axis direction and for predicting a carrier correction value other than said synchronizing signal within said plurality of OFDM symbols by interpolating said synchronizing signal in said frequency axis direction within a plurality of different symbols among synchronizing signals extracted by said extraction circuit;

a weighting composite output circuit for weighting and performing composite output relative to each of said carrier correction values predicted by said first prediction circuit and said second prediction circuit;

a detection circuit for detecting an amount of time variation in said carrier correction values in said time axis direction based on said synchronizing signal in a plurality of different OFDM symbols;

a selection circuit for selecting at least one of the carrier correction values predicted by said first prediction circuit and said second prediction circuit, or a weighting composite value of said carrier correction values, based on a detection result of said detection circuit; and a waveform equivalence circuit for performing waveform equivalence by dividing said data signal transformed by said transformation circuit using a result selected by said selection circuit.

21. An Orthogonal Frequency Division Multiplexing (OFDM) signal demodulating method for an OFDM demodulator that receives an OFDM signal with a tuner and demodulates the OFDM signal, an OFDM symbol defining a transmission unit of the OFDM signal being produced by dividing data streams into a plurality of carriers which are within a predetermined bandwidth and which are modulated with orthogonal modulation and discretely inserting a synchronizing signal with known power and known phase in a predetermined carrier, said OFDM signal demodulating method comprising:

a transformation step of transforming said OFDM signal received with the tuner into a data signal comprising a carrier of said OFDM symbol;

an extraction step of extracting said synchronizing signal from said data signal transformed by said transformation step;

a plurality of time axis filtration steps of predicting carrier correction values based on said synchronizing signal contained within said OFDM symbol which is separated in a time axis direction relative to said carrier regarded as a carrier signal segment for correction and for performing correction in a time axis direction of said carrier signal segment for correction;

a weighting composite output step of weighting and performing composite output relative to each of said carrier correction values predicted by said plurality of time axis filtration steps;

a detection step of detecting an amount of time variation in said carrier correction values in said time axis direction based on said synchronizing signal in a plurality of different OFDM symbols;

a selection step of selecting at least one of said carrier correction values predicted by at least one of said plurality of time axis filtration steps among said carrier correction values predicted by said plurality of time axis filtration steps, or a weighting composite value relative to each of said carrier correction values predicted by said plurality of time axis filtration steps, based on a detection result of said detection step;

a frequency axis prediction step of predicting a correction value in a carrier frequency axis direction of a said carrier regarded as said carrier signal segment for correction based on a result selected by said selection step; and a waveform equivalence step of performing waveform equivalence of said data signal transformed by said transformation step using a result predicted by said frequency axis prediction step.

22. An Orthogonal Frequency Division Multiplexing (OFDM) signal demodulating method for an OFDM demodulator that receives an OFDM signal with a tuner and demodulates the OFDM signal, an OFDM symbol defining a transmission unit of the OFDM signal being produced by dividing data streams into a plurality of carriers which are within a predetermined bandwidth and which are modulated with orthogonal modulation and discretely inserting a synchronizing signal with known power and known phase in a predetermined carrier, said OFDM signal demodulating method comprising:

a transformation step of transforming said OFDM signal received from the tuner into a data signal comprising a carrier of said OFDM symbol;

an extraction step of extracting said synchronizing signal from said data signal transformed by said transformation step;

a time axis prediction step of predicting carrier correction values in a time axis direction of said carrier regarded as a carrier signal segment for correction based on said synchronizing signal extracted by said extraction step;

a weighting composite output step of weighting and performing composite output relative to each of said carrier correction values of said synchronizing signal extracted by said extraction step and predicted by said time axis prediction step;

a detection step of detecting an amount of time variation in said carrier correction values in said time axis direction based on said synchronizing signal in a plurality of different OFDM symbols;

a selection step of selecting at least one of said carrier correction values of said synchronizing signal extracted by said extraction step among said carrier correction values predicted by said time axis prediction step, or a weighting composite value relative to said carrier correction values, based on a detection result of said detection step;

a frequency axis prediction step of predicting a correction value in a carrier frequency axis direction of said carrier regarded as said carrier signal segment for correction based on a result selected by said selection step; and a waveform equivalence step of performing waveform equivalence by dividing said data signal transformed by said transformation step using a result predicted by said frequency axis prediction step.

23. An Orthogonal Frequency Division Multiplexing (OFDM) signal demodulating method for an OFDM demodulator that receives an OFDM signal with a tuner and demodulates the OFDM signal, an OFDM symbol defining a transmission unit of the OFDM signal being produced by dividing data streams into a plurality of carriers which are within a predetermined bandwidth and which are modulated with orthogonal modulation and discretely inserting a synchronizing signal with known power and known phase in a predetermined carrier, said OFDM signal demodulating method comprising:

a transformation step of transforming said OFDM signal received with the tuner into a data signal comprising a carrier of said OFDM symbol;

an extraction step of extracting said synchronizing signal from said data signal transformed by said transformation step;

a first prediction step of predicting a carrier correction value by interpolating said synchronizing signal in a frequency axis direction within a same said OFDM symbol among synchronizing signals extracted by said extraction step, and for designating a carrier signal segment for correction other than said synchronizing signal within said same OFDM symbol;

a second prediction step of predicting a carrier correction value which is regarded as said carrier signal segment for correction other than said synchronizing signal within other OFDM symbols which intervene among said plurality of OFDM symbols by interpolating a prediction result in a time axis direction and for predicting a carrier correction value other than said synchronizing signal within said plurality of OFDM symbols by interpolating said synchronizing signal in said frequency axis direction within a plurality of different symbols among synchronizing signals extracted by said extraction step;

a weighting composite output step of weighting and performing composite output relative to each of said carrier correction values predicted by said first prediction step and said second prediction step;

a detection step of detecting an amount of time variation in said carrier correction values in said time axis direction based on said synchronizing signal in a plurality of different OFDM symbols;

a selection step of selecting at least one of the carrier correction values predicted by said first prediction step and said second prediction step, or a weighting composite value of said carrier correction values, based on a detection result of said detection step; and a waveform equivalence step of performing waveform equivalence by dividing said data signal transformed by said transformation step using a result selected by said selection step.

\* \* \* \* \*